(12) United States Patent
Mapen et al.

(10) Patent No.: US 10,902,104 B2
(45) Date of Patent: Jan. 26, 2021

(54) BIOMETRIC SECURITY SYSTEMS AND METHODS

(71) Applicant: Princeton Identity, Inc., Hamilton, NJ (US)

(72) Inventors: Barry E. Mapen, Stonington, CT (US); David Alan Ackerman, Hopewell, NJ (US)

(73) Assignee: Princeton Identity, Inc., Hamilton, NJ (US)

( * ) Notice: Subject to any disclaimer, the term of this patent is extended or adjusted under 35 U.S.C. 154(b) by 105 days.

(21) Appl. No.: 16/039,442

(22) Filed: Jul. 19, 2018

(65) Prior Publication Data

US 2019/0034606 A1    Jan. 31, 2019

Related U.S. Application Data

(60) Provisional application No. 62/537,253, filed on Jul. 26, 2017.

(51) Int. Cl.
*G06F 21/32* (2013.01)
*G06F 21/36* (2013.01)
(Continued)

(52) U.S. Cl.
CPC .............. *G06F 21/32* (2013.01); *G06F 21/36* (2013.01); *G06F 21/40* (2013.01); *G06K 9/00604* (2013.01)

(58) Field of Classification Search
CPC .......... G06F 21/32; G06F 21/36; G06F 21/40; G06K 9/00604
(Continued)

(56) References Cited

U.S. PATENT DOCUMENTS 3,852,592 A    12/1974  Scoville et al.
3,993,888 A    11/1976  Fellman
(Continued)

FOREIGN PATENT DOCUMENTS

CN    102708357 A    10/2012
CN    103048848 A     4/2013
(Continued)

OTHER PUBLICATIONS

Jacomet, Marcel, Josef Goette, and Andreas Eicher. "On using fingerprint-sensors for pin-pad entry." 4th IEEE International Symposium on Electronic Design, Test and Applications (delta 2008). IEEE, 2008. (Year: 2008).*
(Continued)

*Primary Examiner* — Syed A Zaidi
(74) *Attorney, Agent, or Firm* — McCarter & English, LLP

(57) ABSTRACT

Exemplary embodiments are directed to a biometric security system including an interface, a biometric acquisition device, and a processing device in communication with the interface and biometric acquisition device. The processing device is configured to display a challenge to a subject via the interface, and receive as input a response to the challenge from the subject. Simultaneous to receiving the response to the challenge from the subject, the processing device is configured to capture a biometric characteristic of the subject with the biometric acquisition device. The processing device is configured to analyze the received response to the challenge relative to a preset valid response, and analyze the captured biometric characteristic of the subject for biometric authenticity. The processing device is configured to verify the subject based on both a successful match between the response to the challenge and the preset valid response, and a successful finding of biometric authenticity.

20 Claims, 11 Drawing Sheets

(51) Int. Cl.
  *G06F 21/40*  (2013.01)
  *G06K 9/00*  (2006.01)
(58) Field of Classification Search
  USPC .......................................................... 726/19
  See application file for complete search history.

(56) References Cited

U.S. PATENT DOCUMENTS

| | | |
|---|---|---|
| 4,109,237 A | 8/1978 | Hill |
| 4,641,349 A | 2/1987 | Flom et al. |
| 5,291,560 A | 3/1994 | Daugman |
| 5,337,104 A | 8/1994 | Smith et al. |
| 5,481,622 A | 1/1996 | Gerhardt et al. |
| 5,572,596 A | 11/1996 | Wildes et al. |
| 5,835,616 A | 11/1998 | Lobo et al. |
| 5,861,940 A | 1/1999 | Robinson et al. |
| 5,933,515 A | 8/1999 | Pu et al. |
| 5,953,440 A | 9/1999 | Zhang et al. |
| 5,966,197 A | 10/1999 | Yee |
| 5,987,459 A | 11/1999 | Swanson et al. |
| 6,055,322 A | 4/2000 | Salganicoff et al. |
| 6,081,607 A | 6/2000 | Mori et al. |
| 6,119,096 A | 9/2000 | Mann et al. |
| 6,144,754 A | 11/2000 | Okano et al. |
| 6,204,858 B1 | 3/2001 | Gupta |
| 6,229,907 B1 | 5/2001 | Okano et al. |
| 6,247,813 B1 | 6/2001 | Kim et al. |
| 6,252,976 B1 | 6/2001 | Schildkraut et al. |
| 6,301,370 B1 | 10/2001 | Steffens et al. |
| 6,307,954 B1 | 10/2001 | Suzaki |
| 6,320,610 B1 | 11/2001 | Van Sant et al. |
| 6,421,462 B1 | 7/2002 | Christian et al. |
| 6,424,727 B1 | 7/2002 | Musgrave et al. |
| 6,433,326 B1 | 8/2002 | Levine et al. |
| 6,525,303 B1 | 2/2003 | Gladnick |
| 6,526,160 B1 | 2/2003 | Ito |
| 6,542,624 B1 | 4/2003 | Oda |
| 6,549,644 B1 | 4/2003 | Yamamoto |
| 6,614,919 B1 | 9/2003 | Suzaki et al. |
| 6,714,665 B1 | 3/2004 | Hanna et al. |
| 6,765,581 B2 | 7/2004 | Cheng |
| 6,836,554 B1 | 12/2004 | Bolle et al. |
| 6,850,252 B1 | 2/2005 | Hoffberg |
| 6,851,051 B1* | 2/2005 | Bolle .................... G07C 9/257 713/168 |
| 6,895,103 B2 | 5/2005 | Chen et al. |
| 6,912,298 B1 | 6/2005 | Wilensky |
| 6,970,582 B2* | 11/2005 | Langley ............. G06K 9/00013 382/124 |
| 6,977,989 B2 | 12/2005 | Bothe et al. |
| 7,015,955 B2 | 3/2006 | Funston et al. |
| 7,095,901 B2 | 8/2006 | Lee et al. |
| 7,099,495 B2 | 8/2006 | Kodno et al. |
| 7,118,042 B2 | 10/2006 | Moore et al. |
| 7,130,453 B2 | 10/2006 | Kondo et al. |
| 7,146,027 B2 | 12/2006 | Kim et al. |
| 7,295,686 B2 | 11/2007 | Wu |
| 7,310,443 B1 | 12/2007 | Kris et al. |
| 7,380,938 B2 | 6/2008 | Chmielewski, Jr. et al. |
| 7,428,320 B2 | 9/2008 | Northcott et al. |
| 7,466,308 B2 | 12/2008 | Dehlin |
| 7,466,847 B2 | 12/2008 | Komura |
| 7,542,628 B2 | 6/2009 | Lolacono et al. |
| 7,574,021 B2 | 8/2009 | Matey |
| 7,583,823 B2 | 9/2009 | Jones et al. |
| 7,599,524 B2 | 10/2009 | Camus et al. |
| 7,627,147 B2 | 12/2009 | Lolacono et al. |
| 7,634,114 B2 | 12/2009 | Zappia |
| 7,657,127 B2 | 2/2010 | Lolacono et al. |
| 7,751,598 B2 | 7/2010 | Matey et al. |
| 7,925,059 B2 | 4/2011 | Hoyos et al. |
| 7,986,816 B1* | 7/2011 | Hoanca ............. G06K 9/00597 382/115 |
| 8,050,463 B2 | 11/2011 | Hamza |
| 8,170,293 B2 | 5/2012 | Tosa et al. |
| 8,189,879 B2 | 5/2012 | Cambier |
| 8,195,576 B1 | 6/2012 | Grigg et al. |
| 8,200,980 B1 | 6/2012 | Robinson et al. |
| 8,317,325 B2 | 11/2012 | Raguin et al. |
| 8,337,104 B2 | 12/2012 | Takiguchi et al. |
| 8,374,404 B2 | 2/2013 | Williams et al. |
| 8,553,948 B2 | 10/2013 | Hanna |
| 8,603,165 B2 | 12/2013 | Park |
| 8,639,058 B2 | 1/2014 | Bergen et al. |
| 8,682,073 B2 | 3/2014 | Bergen |
| 8,755,607 B2 | 6/2014 | Bergen et al. |
| 8,854,446 B2 | 10/2014 | Bergen et al. |
| 8,934,005 B2 | 1/2015 | De Bruijn |
| 9,100,825 B2 | 8/2015 | Schultz et al. |
| 9,131,141 B2 | 9/2015 | Tinker et al. |
| 9,195,890 B2 | 11/2015 | Bergen |
| 9,514,365 B2 | 12/2016 | Tinker et al. |
| 9,665,772 B2 | 5/2017 | Bergen |
| 9,836,647 B2 | 12/2017 | Perna et al. |
| 9,836,648 B2 | 12/2017 | Perna et al. |
| 10,025,982 B2 | 7/2018 | Perna et al. |
| 2002/0026585 A1* | 2/2002 | Hondros ................ G06F 21/40 713/183 |
| 2002/0080141 A1 | 6/2002 | Imai et al. |
| 2002/0118864 A1 | 8/2002 | Kondo et al. |
| 2002/0150280 A1 | 10/2002 | Li |
| 2002/0154794 A1 | 10/2002 | Cho |
| 2002/0164054 A1 | 11/2002 | McCartney et al. |
| 2002/0173354 A1* | 11/2002 | Winans ................ G07F 17/32 463/20 |
| 2002/0180586 A1 | 12/2002 | Kitson et al. |
| 2003/0046553 A1 | 3/2003 | Angelo |
| 2003/0103652 A1 | 6/2003 | Lee et al. |
| 2003/0123711 A1 | 7/2003 | Kim et al. |
| 2003/0169334 A1 | 9/2003 | Braithwaite et al. |
| 2003/0174211 A1 | 9/2003 | Imaoka et al. |
| 2004/0037452 A1 | 2/2004 | Shin |
| 2004/0088584 A1 | 5/2004 | Shachar et al. |
| 2004/0146187 A1 | 7/2004 | Jeng |
| 2004/0170304 A1 | 9/2004 | Haven |
| 2004/0213437 A1 | 10/2004 | Howard et al. |
| 2004/0236549 A1 | 11/2004 | Dalton |
| 2005/0047655 A1 | 3/2005 | Luo et al. |
| 2005/0063582 A1 | 3/2005 | Park et al. |
| 2005/0084179 A1 | 4/2005 | Hanna et al. |
| 2005/0088200 A1 | 4/2005 | Takekuma et al. |
| 2005/0165327 A1 | 7/2005 | Thibault et al. |
| 2005/0187883 A1* | 8/2005 | Bishop ................ G06Q 20/027 705/67 |
| 2005/0210267 A1 | 9/2005 | Sugano et al. |
| 2005/0270386 A1 | 12/2005 | Saitoh et al. |
| 2006/0008125 A1 | 1/2006 | Lauper et al. |
| 2006/0028617 A1 | 2/2006 | Matsumura et al. |
| 2006/0098097 A1 | 5/2006 | Wach et al. |
| 2006/0105806 A1 | 5/2006 | Vance et al. |
| 2006/0120570 A1 | 6/2006 | Azuma et al. |
| 2006/0140454 A1 | 6/2006 | Northcott et al. |
| 2006/0150928 A1 | 7/2006 | Lehmann et al. |
| 2006/0184243 A1 | 8/2006 | Yilmaz |
| 2006/0202036 A1 | 9/2006 | Wang et al. |
| 2006/0210123 A1 | 9/2006 | Kondo et al. |
| 2006/0222212 A1 | 10/2006 | Du et al. |
| 2006/0245623 A1 | 11/2006 | Loiacono et al. |
| 2006/0274918 A1 | 12/2006 | Amantea et al. |
| 2007/0014439 A1 | 1/2007 | Ando |
| 2007/0025598 A1 | 2/2007 | Kobayashi et al. |
| 2007/0036397 A1 | 2/2007 | Hamza |
| 2007/0047770 A1 | 3/2007 | Swope et al. |
| 2007/0140531 A1 | 6/2007 | Hamza |
| 2007/0160266 A1 | 7/2007 | Jones et al. |
| 2007/0174628 A1* | 7/2007 | Charrette, III .......... G06F 21/83 713/182 |
| 2007/0189582 A1 | 8/2007 | Hamza et al. |
| 2007/0198850 A1 | 8/2007 | Martin et al. |
| 2007/0201728 A1 | 8/2007 | Monro |
| 2007/0206935 A1 | 9/2007 | Ono |
| 2007/0236567 A1 | 10/2007 | Pillman et al. |
| 2007/0285537 A1 | 12/2007 | Dwinell et al. |
| 2008/0021331 A1 | 1/2008 | Grinvald et al. |

(56) References Cited

U.S. PATENT DOCUMENTS

| | | |
|---|---|---|
| 2008/0049185 A1 | 2/2008 | Huffman et al. |
| 2008/0069411 A1 | 3/2008 | Friedman et al. |
| 2008/0121721 A1 | 5/2008 | Chen et al. |
| 2008/0180544 A1 | 7/2008 | Drader et al. |
| 2008/0187174 A1 | 8/2008 | Metaxas et al. |
| 2008/0219515 A1 | 9/2008 | Namgoong |
| 2008/0271116 A1 | 10/2008 | Robinson et al. |
| 2009/0041309 A1 | 2/2009 | Kim |
| 2009/0049536 A1* | 2/2009 | Ooi .................. G06F 21/78 726/9 |
| 2009/0092292 A1 | 4/2009 | Carver et al. |
| 2009/0208064 A1 | 8/2009 | Cambier |
| 2009/0216606 A1 | 8/2009 | Coffman et al. |
| 2009/0220126 A1 | 9/2009 | Claret-Tournier et al. |
| 2009/0232418 A1 | 9/2009 | Lolacono et al. |
| 2009/0278922 A1 | 11/2009 | Tinker et al. |
| 2010/0026853 A1 | 2/2010 | Mokhnatyuk |
| 2010/0034529 A1 | 2/2010 | Jelinek |
| 2010/0046808 A1 | 2/2010 | Connell et al. |
| 2010/0063880 A1 | 3/2010 | Atsmon et al. |
| 2010/0082398 A1 | 4/2010 | Davis et al. |
| 2010/0142938 A1 | 6/2010 | Zhang |
| 2010/0176802 A1 | 7/2010 | Huguet |
| 2010/0238316 A1 | 9/2010 | Kim et al. |
| 2010/0278394 A1 | 11/2010 | Raguin et al. |
| 2010/0287053 A1 | 11/2010 | Ganong et al. |
| 2010/0290668 A1 | 11/2010 | Friedman et al. |
| 2010/0301113 A1 | 12/2010 | Bohn et al. |
| 2010/0310133 A1 | 12/2010 | Mason et al. |
| 2010/0328420 A1 | 12/2010 | Roman |
| 2011/0007205 A1 | 1/2011 | Lee |
| 2011/0043683 A1 | 2/2011 | Beach et al. |
| 2011/0075893 A1 | 3/2011 | Connel, II et al. |
| 2011/0081946 A1 | 4/2011 | Singh |
| 2011/0134268 A1 | 6/2011 | MacDonald |
| 2011/0142297 A1 | 6/2011 | Yu et al. |
| 2011/0167489 A1* | 7/2011 | Ziv .................. G06F 21/31 726/19 |
| 2011/0187878 A1 | 8/2011 | Mor et al. |
| 2011/0317991 A1 | 12/2011 | Tsai |
| 2012/0086645 A1 | 4/2012 | Zheng et al. |
| 2012/0154536 A1 | 6/2012 | Stoker et al. |
| 2012/0155716 A1 | 6/2012 | Kim |
| 2012/0163783 A1 | 6/2012 | Braithwaite et al. |
| 2012/0243729 A1 | 9/2012 | Pasquero |
| 2012/0293642 A1 | 11/2012 | Berini et al. |
| 2013/0014153 A1 | 1/2013 | Bhatia et al. |
| 2013/0044199 A1 | 2/2013 | Nanu et al. |
| 2013/0051631 A1 | 2/2013 | Hanna |
| 2013/0081119 A1 | 3/2013 | Sampas |
| 2013/0083185 A1 | 4/2013 | Coleman, III |
| 2013/0089240 A1 | 4/2013 | Northcott et al. |
| 2013/0091520 A1 | 4/2013 | Chen |
| 2013/0147603 A1 | 6/2013 | Malhas et al. |
| 2013/0150120 A1 | 6/2013 | Wu et al. |
| 2013/0162798 A1 | 6/2013 | Hanna et al. |
| 2013/0188943 A1 | 7/2013 | Wu |
| 2013/0194407 A1 | 8/2013 | Kim |
| 2013/0215228 A1 | 8/2013 | Stoker et al. |
| 2013/0250085 A1 | 9/2013 | MacKinnon |
| 2013/0329115 A1 | 12/2013 | Palmeri |
| 2014/0046772 A1 | 2/2014 | Raman |
| 2014/0055337 A1 | 2/2014 | Karlsson |
| 2014/0059607 A1 | 2/2014 | Upadhyay et al. |
| 2014/0071547 A1 | 3/2014 | O'Neill et al. |
| 2014/0078389 A1 | 3/2014 | Merz |
| 2014/0161325 A1 | 6/2014 | Bergen |
| 2014/0165175 A1* | 6/2014 | Sugiyama ............ G06F 21/552 726/8 |
| 2014/0171150 A1 | 6/2014 | Hurst et al. |
| 2014/0232930 A1 | 8/2014 | Anderson |
| 2014/0327815 A1 | 11/2014 | Auger |
| 2014/0369575 A1 | 12/2014 | Riopka et al. |
| 2015/0037935 A1 | 2/2015 | Kim et al. |
| 2015/0098629 A1 | 4/2015 | Perna et al. |
| 2015/0098630 A1 | 4/2015 | Perna et al. |
| 2015/0126245 A1 | 5/2015 | Barkan et al. |
| 2015/0193666 A1 | 7/2015 | Derakhshani et al. |
| 2015/0227790 A1 | 8/2015 | Smits |
| 2015/0286864 A1 | 10/2015 | Gottemukkula et al. |
| 2015/0338915 A1 | 11/2015 | Publicover et al. |
| 2015/0379325 A1 | 12/2015 | Tinker et al. |
| 2016/0012275 A1 | 1/2016 | Bergen |
| 2016/0012292 A1 | 1/2016 | Perna et al. |
| 2016/0014121 A1 | 1/2016 | Perna et al. |
| 2016/0022167 A1* | 1/2016 | Simon ............. A61B 5/04842 600/301 |
| 2016/0112414 A1* | 4/2016 | Tsou .................. H04L 63/0861 726/7 |
| 2016/0117544 A1 | 4/2016 | Hoyos et al. |
| 2016/0148384 A1 | 5/2016 | Bud et al. |
| 2016/0180169 A1 | 6/2016 | Bae et al. |
| 2016/0274660 A1 | 9/2016 | Publicover et al. |
| 2016/0345818 A1 | 12/2016 | Suzuki et al. |
| 2016/0364609 A1 | 12/2016 | Ivanisov et al. |
| 2017/0032174 A1* | 2/2017 | Turgeman ............. G06F 3/017 |
| 2017/0111568 A1 | 4/2017 | Hsieh et al. |
| 2017/0124314 A1 | 5/2017 | Laumea |
| 2017/0132399 A1 | 5/2017 | Pawluk et al. |
| 2017/0286790 A1 | 10/2017 | Mapen et al. |
| 2017/0286792 A1 | 10/2017 | Ackerman et al. |
| 2017/0323167 A1 | 11/2017 | Mapen et al. |
| 2017/0337439 A1 | 11/2017 | Ackerman et al. |
| 2017/0337440 A1 | 11/2017 | Green et al. |
| 2017/0337441 A1 | 11/2017 | Mapen et al. |
| 2017/0347000 A1 | 11/2017 | Perna et al. |
| 2018/0025244 A1 | 1/2018 | Bohl et al. |
| 2018/0165537 A1 | 6/2018 | Ackerman |
| 2018/0336336 A1* | 11/2018 | Elovici ............... G06F 21/36 |

FOREIGN PATENT DOCUMENTS

| | | |
|---|---|---|
| CN | 103099624 A | 5/2013 |
| EP | 0821912 A2 | 2/1998 |
| EP | 1324259 A1 | 7/2003 |
| JP | 2007011667 A | 1/2007 |
| JP | 2008-538425 A | 10/2008 |
| JP | 4372321 B2 | 11/2009 |
| KR | 2003-0066512 A | 8/2003 |
| KR | 10-2011-0134848 A | 12/2011 |
| WO | WO-1996/19132 A1 | 6/1996 |
| WO | WO-1997/14873 A1 | 4/1997 |
| WO | WO-1997/21188 A1 | 6/1997 |
| WO | WO-1998/08439 A1 | 3/1998 |
| WO | WO-1999/31183 A1 | 6/1999 |
| WO | WO-2000/39760 A1 | 7/2000 |
| WO | WO-2013/056001 A1 | 4/2013 |
| WO | WO-2014/093227 A1 | 6/2014 |
| WO | WO-2014/100250 A2 | 6/2014 |
| WO | WO-2015/102704 A2 | 7/2015 |
| WO | WO-2017/172695 A1 | 10/2017 |
| WO | WO-2017/173228 A1 | 10/2017 |

OTHER PUBLICATIONS

Cymek, Dietlind Helene, et al. "Entering PIN codes by smooth pursuit eye movements." (2014). (Year: 2014).*

Usher, David, Yasunari Tosa, and Marc Friedman. "Ocular biometrics: simultaneous capture and analysis of the retina and iris." Advances in Biometrics. Springer, London, 2008. 133-155. (Year: 2008).*

Lee, Hyeon Chang, et al. "A new mobile multimodal biometric device integrating finger vein and fingerprint recognition." Proceedings of the 4th International Conference on Ubiquitous Information Technologies & Applications. IEEE, 2009. (Year: 2009).*

Macek, Nemanja, et al. "Multimodal biometric authentication in IoT: Single camera case study." (2016): 33-38. (Year: 2016).*

NPL Search Results (Year: 2020).*

Annapoorani et al., Accurate and Fast Iris Segmentation. International Journal of Engineering Science and Technology. 2010;2(6):1492-1499.

(56) References Cited

OTHER PUBLICATIONS

Arfken, G., "Mathematical Methods for Physicists," Academic Press, NY 6.sup.th Ed. (2005).
Atos Origin, "UK Passport Service, Biometrics Enrollment Trial." Atos Origin Report (May 2005).
Bertalmio et al., Navier-Stokes, Fluid Dynamics, and Image and Video Inpainting. Proceedings of the 2001 IEEE Computer Society Conferenc on Computer Vision and Pattern Recognition. CVPR 2001, 8 pages, (2001).
Betke, et al., "Preliminary Investigation of Real-time Monitoring of a Driver in City Traffic," IEEE Intelligent Vehicles Syposium, Oct. 3-5, 2000, Dearborn, MI, 563-568.
Boehnen et al., A Multi-Sample Standoff Multimodal Biometric System, Theory, Aoolications and Systems (BTAS), Sep. 23, 2012, pp. 127-134.
Bowyer et al., Image Understanding for Iris Biometrics: A Survey. Computer Vision and Image Understanding. 2008;110:281-307.
Braithwaite, Michael et al., "Application-Specific Biometric Templates," AutoID 2002 Workshop, Tarrytown, NY, pp. 1-10 (2002).
Burt, et al., "The Laplacian Pyramid as a Compact Image Code," IEEE Transactions on Communications, 31(4): 532-540, 1983.
Canadian Offic Action for Application 2,833,740 dated Jan. 15, 2018.
Office Action dated Nov. 19, 2018, issued in connection with U.S. Appl. No. 15/661,297 (22 pages).
Office Action dated Oct. 30, 2018, issued in connection with U.S. Appl. No. 15/514,098 (35 pages).
Office Action dated Sep. 26, 2018, issued in connection with U.S. Appl. No. 15/471,131 (15 pages).
Daugman John, "How Iris Recognition Works," IEEE Transactions on Circuits and Systems for Video Teohnology, vol. 14, No. 1 (Jan. 2004).
Daugman, J., "High confidence visual recognition of persons by a test of statistical independence", IEEE Transactions on Pattern Analysis and Machine Intelligence, 15 (11), pp. 1148-1161 (1993).
Daugman, J., "Recognizing Persons by Their Iris Patterns," in Biometrics: Personal Indentification in a Networked Society, A.K. Jain, et al., eds. Kluwer Academic Pub. 1999.
Daugman, John et al., "Iris recognition border-crossing system in the UAE," International Airport Review, Issue 2 (2004).
Daugman, John."How Iris Recognition Works".Jun. 13, 2003. IEEE Transactions on Circuits and Systems for Video technology, vol. 14, No. 1.
Daugman, The Importance of Being Random: Statistical Principles of Iris Recognition. Pattern Recognition. Pre-publication version. 13 pages, Dec. 21, 2001.
DellaVecchia, et al., "Methodology and apparatus for using the human iris as a robust biometric," Ophthalmic Technologies VIII, SPIE Biomedical Optics Society, Photonics West Conference, San Jose, CA Jan. 24, 1998.
Du et al., Analysis of Partial Iris Recognition Using a 1-D Approach. Proceedings, IEEE International Conference on Acoustics, Speech, and Signal Processing. Mar. 18-23, 2005;2;961-964.
European Office Action for Application 12719332.4 dated Jan. 29, 2018.
European Search Report for Apllication 14876521.7 dated Oct. 19, 2017.
Extended European Search Report in connection with European Patent Application No. 15864635.6 dated Jun. 6, 2018 (8 pages).
Fan, et al., "An Efficient Automatic Iris Image Acquisition and Preprocessing System," Proceedings of the 2006 IEEE International Conference on Mechatronics and Automation, pp. 1779-1784 (6 pages).
Final Office Action dated Aug. 18, 2016 from U.S. Appl. No. 14/858,715, filed Sep. 18, 2015 (6 pages).
Final Office Action dated Aug. 4, 2016 from U.S. Appl. No. 14/509,366, filed Oct. 8, 2014 (24 pages).
Final Office Action dated Mar. 21, 2017 from U.S. Appl. No. 14/863,936, filed Sep. 24, 2015 (17 pages).
Final Office Action dated Mar. 22, 2017 from U.S. Appl. No. 14/863,950, filed Sep. 24, 2015 (16 pages).
Final Office Action dated Mar. 22, 2017 from U.S. Appl. No. 14/863,960, filed Sep. 24, 2015 (21 pages).
Final Office Action for U.S. Appl. No. 10/818,307, dated Jan. 21, 2009, 28 pages.
Final Office Action for U.S. Appl. No. 10/818,307, dated Jan. 30, 2008, 19 pages.
Final Office Action for U.S. Appl. No. 11/377,042, dated Nov. 14, 2008, 20 pages.
Final Office Action for U.S. Appl. No. 11/510,197, dated May 5, 2009, 16 pages.
Final Office Action for U.S. Appl. No. 12/464,369, dated Aug. 5, 2014, 22 pages.
Final Office Action for U.S. Appl. No. 12/464,369, dated Oct. 3, 2012, 27 pages.
Final Office Action for U.S. Appl. No. 12/576,644, dated Oct. 13, 2010, 11 pages.
Final Office Action for U.S. Appl. No. 14/100,615, dated Sep. 1, 2015, 22 pages.
Final Office Action for U.S. Appl. No. 14/509,356, dated Sep. 28, 2016, 20 pages.
Final Office Action for U.S. Appl. No. 14/509,366, dated Aug. 4, 2016, 29 pages.
Final Office Action for U.S. Appl. No. 14/846,090, dated Jun. 15, 2016, 17 pages.
Final Office Action for U.S. Appl. No. 14/858,715, dated Aug. 18, 2016, 29 pages.
Final Office Action for U.S. Appl. No. 14/858,715, dated Aug. 18, 2016, 6 pages.
Final Office Action for U.S. Appl. No. 14/863,936, dated Mar. 21, 2017, 17 pages.
Final Office Action for U.S. Appl. No. 14/863,950, dated Mar. 22, 2017, 16 pages.
Final Office Action for U.S. Appl. No. 14/863,960, dated Mar. 22, 2017, 21 pages.
First Japanese Office Action for Application 2015-545911 dated Feb. 26, 2018 ( with English translation).
FIT Validation Studies, http://www.pmifit.com/validation.htm, Mar. 2, 2004.
Google Scholar Search—"Rida Hadma" pp. 1 of 2.
Haro, et al., "Detecting and Tracking Eyes by Using Their Physiological Properties, Dynamics and Appearance," CVPR 2000, 163-168.
Hutchinson, et al., "Human-Computer Interaction Using Eye-Gaze Input," IEEE Transaction on Systems, Man and Cybernetics, 19(6): 1527-1534, 1989.
International Biometrics Group, "Independent Testing of Iris Recognition Technology, Final Report," Study Commissioned by the US Department of Homeland Security (May 2005).
International Preliminary Report on Patentability for Application No. PCT/US2015/051863, dated Mar. 28, 2017, 6 pages.
International Search Report and Written Opinion for Application No. PCT/US17/13110, dated May 18, 2017, 12 pages.
International Search Report and Written Opinion for Application No. PCT/US17/24444, dated Jun. 19, 2017, 9 pages.
International Search Report and Written Opinion for Application No. PCT/US2013/073887, dated Mar. 20, 2014, 11 pages.
International Search Report and Written Opinion for Application No. PCT/US2017/025303, dated Jun. 16, 2017, 11 pages.
International Search Report and Written Opinion for PCT/US2017/24444 dated Jun. 19, 2017 pp. 1-15.
International Search Report and Written Opinion for PCT/US2018/042807, dated Sep. 27, 2018, pp. 1-19.
International Search Report and Written Opinionf for PCT/US2017/025303 dated Jun. 16, 2017.
International Search Report for Application No. PCT/US2015/051863, dated Dec. 10, 2015, 1 page.
International Search Report for Application No. PCT/US2017/065793, dated Feb. 16, 2018, 3 pages.
International Search Report for PCT/US2015061024, dated Mar. 31, 2016.

(56) References Cited

OTHER PUBLICATIONS

International Search Report of the International Searching Authority dated Jun. 28, 2018, issued in connection with International Application No. PCT/US2018/025895 (3 pages).
Iwai, Daisuke, Shoichiro Mihara, and Kosuke Sato. "Extended depth-of-field projector by fast focal sweep projection." IEEE transactions on visualization and computer graphics 21.4 (2015): 462-470.
Jacob, R., "The Use of Eye Movements in Human-Computer Interaction Techniques: What you Look At is What you Get," ACM Trans. Info.Sys., 9(3):152-169.
Japanese Office Action for Application No. 2015-545911, dated Feb. 20, 2018, 6 pages.
Li, Zexi, "An Iris Recognition Algorithm Based on Coarse and Fine Location," 2017 IEEE 2nd International Conference on Big Data Analysis, pp. 744-747 (4 pages).
Ma et al., "Efficient Iris Recognition by Characterizing Key Local Variations", IEEE Transactions on Image Processing, vol. 13, No. 6, Jun. 2004, 12 pages.
Ma., et al. "Iris Recognition Using Circular Symmetric Filters," Pattern Recognition, 2002, Proceedings 16th International Conference on vol. 2 IEEE, 2002 (4 pages).
Ma., et al., "Iris Recognition Based on Multichannel Gabor Filtering" ACCV2002: The 5th Asian Conference on Computer Vision, Jan. 23-25, 2002, Melbourne, Australia (5 pages).
Mansfield, Tony et al., "Biometric Product Testing Final Report," CESG Contract X92A/4009309, CESG/BWG Biometric Test Programme; Centre for Mathematics & Scientific Computing, National Physical Laboratory (2001).
Matey et al., Iris on the Move: Acquisition of Images for Iris Recognition in Less Constrained Environments. Proceedings of the IEEE. Nov. 2006;94(11):1936-1947.
Miyazawa et al., Iris Recognition Algorithm Based on Phase-Only Correlation, The Institute of Image Information and Television Engineers, JapanJun. 27, 2006, vol. 30, No. 33, pp. 45-48.
Monro et al., An Effective Human Iris Code with Low Complexity. IEEE International Conference on Image Processing. Sep. 14, 2005;3:277-280.
Narayanswamy, et al., "Extended Depth-of-Field Iris Recognition System for a Workstation Environment," Proc. SPIE. vol. 5779 (2005) (10 pages).
Negin, et al., "An Iris Biometric System for Public and Personal Use," IEEE Computer, pp. 70-75, Feb. 2000.
Nguyen, et al., "Quality-Driven Super-Resolution for Less Constrained Iris Recognition at a Distance and on the Move," IEEE Transactions on Information Forensics and Security 6.4 (2011) pp. 1248-1558 (11 pages).
Non-Final Office Action for U.S. Appl. No. 10/809,471, dated Mar. 19, 2007, 12 pages.
Non-Final Office Action for U.S. Appl. No. 10/818,307, dated Jul. 10, 2008, 28 pages.
Non-Final Office Action for U.S. Appl. No. 10/818,307, dated Mar. 20, 2007, 22 pages.
Non-Final Office Action for U.S. Appl. No. 11/334,968, dated Jan. 6, 2009, 28 pages.
Non-Final Office Action for U.S. Appl. No. 11/377,042, dated Apr. 8, 2009, 22 pages.
Non-Final Office Action for U.S. Appl. No. 11/377,042, dated Jan. 7, 2008, 13 pages.
Non-Final Office Action for U.S. Appl. No. 11/510,197, dated Oct. 10, 2008, 36 pages.
Non-Final Office Action for U.S. Appl. No. 11/510,197, dated Oct. 8, 2009, 21 pages.
Non-Final Office Action for U.S. Appl. No. 11/849,969, dated Dec. 19, 2008, 17 pages.
Non-Final Office Action for U.S. Appl. No. 11/857,432, dated Dec. 30, 2008, 23 pages.
Non-Final Office Action for U.S. Appl. No. 12/429,695, dated Sep. 2, 2009, 11 pages.
Non-Final Office Action for U.S. Appl. No. 12/464,369, dated Jan. 2, 2015, 23 pages.
Non-Final Office Action for U.S. Appl. No. 12/464,369, dated May 9, 2012, 33 pages.
Non-Final Office Action for U.S. Appl. No. 12/576,644, dated Jul. 14, 2010, 14 pages.
Non-Final Office Action for U.S. Appl. No. 13/096,716, dated May 23, 2013, 16 pages.
Non-Final Office Action for U.S. Appl. No. 13/096,724, dated Jan. 16, 2014, 29 pages.
Non-Final Office Action for U.S. Appl. No. 13/096,728, dated May 7, 2013, 33 pages.
Non-Final Office Action for U.S. Appl. No. 13/096,728, dated Nov. 8, 2012, 37 pages.
Non-Final Office Action for U.S. Appl. No. 14/100,615, dated Mar. 4, 2015, 19 pages.
Non-Final Office Action for U.S. Appl. No. 14/509,356, dated Feb. 29, 2016, 19 pages.
Non-Final Office Action for U.S. Appl. No. 14/509,356, dated Mar. 16, 2017, 21 pages.
Non-Final Office Action for U.S. Appl. No. 14/509,366, dated Feb. 21, 2017, 25 pages.
Non-Final Office Action for U.S. Appl. No. 14/509,366, dated Mar. 3, 2016, 40 pages.
Non-Final Office Action for U.S. Appl. No. 14/846,090, dated Jan. 7, 2016, 35 pages.
Non-Final Office Action for U.S. Appl. No. 14/858,715, dated Mar. 14, 2016, 37 pages.
Non-Final Office Action for U.S. Appl. No. 14/863,936, dated Aug. 4, 2016, 16 pages.
Non-Final Office Action for U.S. Appl. No. 14/863,936, dated Sep. 26, 2017, 28 pages.
Non-Final Office Action for U.S. Appl. No. 14/863,950, dated Aug. 3, 2016, 15 pages.
Non-Final Office Action for U.S. Appl. No. 14/863,950, dated Sep. 26, 2017, 22 pages.
Non-Final Office Action for U.S. Appl. No. 14/863,960, dated Aug. 3, 2016, 21 pages.
Non-Final Office Action for U.S. Appl. No. 14/863,960, dated Sep. 28, 2017, 28 pages.
Non-Final Office Action for U.S. Appl. No. 15/475,425, dated Jul. 12, 2018, 31 pages.
Non-Final Office Action for U.S. Appl. No. 15/531,922, dated Jun. 12, 2018, 17 pages.
Non-Final Office Action for for U.S. Appl. No. 12/464,369, dated Feb. 27, 2014, 25 pages.
Notice of Allowance dated Feb. 1, 2017 from U.S. Appl. No. 14/858,715, filed Sep. 18, 2015 (8 pages).
Notice of Allowance for U.S. Appl. No. 10/809,471, dated Mar. 24, 2008, 14 pages.
Notice of Allowance for U.S. Appl. No. 10/809,471, dated Oct. 5, 2007, 11 pages.
Notice of Allowance for U.S. Appl. No. 10/818,307, dated May 18, 2009, 8 pages.
Notice of Allowance for U.S. Appl. No. 11/334,968, dated Apr. 17, 2009, 11 pages.
Notice of Allowance for U.S. Appl. No. 11/377,042, dated Sep. 8, 2009, 16 pages.
Notice of Allowance for U.S. Appl. No. 11/510,197, dated Feb. 1, 2010, 13 pages.
Notice of Allowance for U.S. Appl. No. 11/849,969, dated Aug. 20, 2009, 21 pages.
Notice of Allowance for U.S. Appl. No. 11/849,969, dated Jul. 10, 2009, 18 pages.
Notice of Allowance for U.S. Appl. No. 11/857,432, dated Jun. 17, 2009, 17 pages.
Notice of Allowance for U.S. Appl. No. 12/429,695, dated Dec. 15, 2009, 7 pages.
Notice of Allowance for U.S. Appl. No. 12/429,695, dated Nov. 17, 2009, 12 pages.
Notice of Allowance for U.S. Appl. No. 12/464,369, dated May 8, 2015, 29 pages.

(56) References Cited

OTHER PUBLICATIONS

Notice of Allowance for U.S. Appl. No. 12/576,644, dated Dec. 10, 2010, 14 pages.
Notice of Allowance for U.S. Appl. No. 13/096,716, dated Oct. 30, 2013, 25 pages.
Notice of Allowance for U.S. Appl. No. 13/096,724, dated Aug. 19, 2014, 17 pages.
Notice of Allowance for U.S. Appl. No. 13/096,728, dated Feb. 7, 2014, 33 pages.
Notice of Allowance for U.S. Appl. No. 13/096,735, dated Jun. 24, 2013, 24 pages.
Notice of Allowance for U.S. Appl. No. 13/096,735, dated Oct. 4, 2013, 26 pages.
Notice of Allowance for U.S. Appl. No. 14/100,615, dated Sep. 28, 2015, 22 pages.
Notice of Allowance for U.S. Appl. No. 14/509,356, dated Aug. 1, 2017, 29 pages.
Notice of Allowance for U.S. Appl. No. 14/509,366, dated Jul. 31, 2017, 59 pages.
Notice of Allowance for U.S. Appl. No. 14/846,090, dated Jul. 25, 2016, 22 pages.
Notice of Allowance for U.S. Appl. No. 14/858,715, dated Feb. 1, 2017, 42 pages.
Notice of Allowance for U.S. Appl. No. 14/858,715, dated Feb. 1, 2017, 8 pages.
Notice of Allowance for U.S. Appl. No. 14/858,715, dated Mar. 1, 2017, 13 pages.
Notice of Allowance for U.S. Appl. No. 14/863,936, dated Mar. 20, 2018, 9 pages.
Notice of Allowance for U.S. Appl. No. 14/863,950, dated Mar. 27, 2018, 9 pages.
Notice of Allowance for U.S. Appl. No. 14/863,960, dated Mar. 20, 2018, 9 pages.
Office Action dated Aug. 3, 2016 from U.S. Appl. No. 14/863,950, filed Sep. 24, 2015 (15 pages).
Office Action dated Aug. 3, 2016 from U.S. Appl. No. 14/863,960, filed Sep. 24, 2015 (21 pages).
Office Action dated Aug. 4, 2016 from U.S. Appl. No. 14/863,936, filed Sep. 24, 2015 (16 pages).
Office Action dated Feb. 21, 2017 from U.S. Appl. No. 14/509,366, filed Oct. 8, 2014 (25 pages).
Office Action dated Mar. 14, 2016 from U.S. Appl. No. 14/858,715, filed Sep. 18, 2015 (9 pages).
Office Action dated Mar. 3, 2016 from U.S. Appl. No. 14/509,366, filed Oct. 8, 2014 (19 pages).
Ortiz et al., An Optimal Strategy for Dilation Based Iris Image Enrollment. IEEE International Joint Conference on Biometrics. 6 pages, Sep. 29-Oct. 2, 2014.
Restriction Requirement for U.S. Appl. No. 11/510,197, dated May 16, 2008, 12 pages.
Robert J.K. Jakob, "Eye Movement Based Human Computer Interaction Techniques; Toward Non-Command Interfaces," Advances in Human-Computer Interaction, vol. 4, ed. by H.R. Hartson and D. Hix, pp. 151-190, Ablex Publishing Co., Norwood, N.J. (1993).
Robert J.K. Jakob, "Eye Tracking in Advanced Interface Design," in Virtual Environments and Advanced Interface Dseign, ed. by W. Barfield and T.A. Furness, pp. 258-288, Oxford University Press, New York (1995).
Roth, Mouthpiece Meditations, Part 3. Online Trombone Journal, www.trombone.org. 5 pages, Jul. 23, 2018.
Schovanec, Ocular Dynamics and Skeletal Systems, IEEE Control Systems Magazine. Aug. 2001;21(4):70-79.
Scoblete, The Future of the Electronic Shutter. pdn, Photo District News, retrieved online at: https://www.pdnonline.com/gear/cameras/the-future-of-the-electronic-shutter/, 6 pates, May 9, 2016.
Second Japanese Office Action for Application 2015-545911 dated Feb. 26, 2018 ( with English translation).
Singapore Search Report and Written Report for Application No. 11201704097X, dated Mar. 13, 2018, 5 pages.
SRI International, "Seeing the Future of Iris Recognition", available at www.sri.com/iom, Mar. 2014, 9 pages.
Swiniarski, Experiments on Human Recognition Using Error Backpropagation Artificial Neural Network. Neural Networks Class (CS553) of San Diego State University Computer Science Department, Apr. 2004.
Tan et al., Efficient Iris Recognition by Characterizing Key Local Variations. IEEE Transactions on Image Processing. Jun. 2004;13(6):739-750.
U.S. Appl. No. 14/100,615, "Iris Biometric Matching System", filed Dec. 9, 2013, 57 pages.
U.S. Appl. No. 14/100,615, "Iris Biometric Matching System," filed Dec. 9, 2013, 61 pages.
U.S. Appl. No. 61/888,130, filed Oct. 8, 2013, 20 pages.
Van der Wal, et al., "The Acadia Vision Processor," IEEE International Workshop on Computer Architecture for Machine Perception, pp. 31-40, Padova, Italy, Sep. 11-13, 2000.
Weisstein E. et al.; "Circle" From MathWorld—A Wolfram Web Resource. www.mathworld.wolfram.com/circle.html, pp. 1 to 8., Jul. 3, 2008.
Wildes, R., "Iris Recognition: An Emerging Biometric Technology," Proc. IEEE, 85(9):1348-1363, Sep. 1997.
Written Opinion for Application No. PCT/US2015/051863, dated Dec. 10, 2015, 5 pages.
Written Opinion for Application No. PCT/US2017/065793, dated Feb. 16, 2018, 10 pages.
Written Opinion for PCT/US2015061024, dated Mar. 21, 2016.
Written Opinion of the International Searching Authority dated Jun. 28, 2018, issued in connection with International Application No. PCT/US2018/025895 (10 pages).
www.m-w.com—definition—"ellipse" (Refer to Ellipse Illustration; also attached) pp. 1 of 2.
Yokoya, Ryunosuke, and Shree K. Nayar. "Extended depth of field catadioptric imaging using focal sweep." Proceedings of the IEEE International Conference on Computer Vision. 2015.
Zhu, et al., "Biometric Personal Identification Based on Iris Patterns," Pattern Recognition, Proceedings 15th International Conference on vol. 2 IEEE (2000) (4 pages).

* cited by examiner

BIOMETRIC SECURITY SYSTEMS AND METHODS

CROSS-REFERENCE TO RELATED APPLICATIONS

The present application claims the benefit of priority to U.S. Provisional Application No. 62/537,253, filed Jul. 26, 2017, which is hereby incorporated by reference in its entirety.

TECHNICAL FIELD

The present disclosure relates to biometric security systems and methods and, in particular, to systems that verify a subject based on a combination of a response to a non-biometric challenge and biometric authenticity.

BACKGROUND

Security is a concern in a variety of transactions involving private information. Biometric identification systems have been used in government and commercial systems around the world to enable secure transactions. Biometric systems generally use a unique feature of an individual to be enrolled and then verified to gain access to a system. For example, traditional biometric systems can use unique features associated with a fingerprint, face, iris or voice to verify an individual's identity.

In one class of attacks against traditional biometric systems, the spoofer presents a facsimile of the real user's biometric feature to the system which, if adequately realistic in terms of the system criteria, can trick the system which then gives access to the spoofer. Examples of such attacks include the gummy-bear fingerprint spoof attack and the use of a photograph to trick a face recognition system of a smart phone. Defenses against biometric facsimile attacks include liveness testing. In the case of iris recognition systems, pupilometry includes a light to stimulate pupil contraction and the system measures saccadic eye movement. Both pupil contraction and saccades are involuntary and cannot be easily mimicked by a photograph or a video. However, because they are involuntary or passive, the type of information retrieved from pupil contraction and saccades can be limited.

Thus, a need exists for an improved method of identifying subjects while enhancing security to counter spoofing attacks. These and other needs are addressed by the biometric security systems and methods of the present disclosure.

SUMMARY

In accordance with embodiments of the present disclosure, an exemplary biometric security system is provided that includes an interface, a camera, and a processing device in communication with the interface and camera. The processing device can be configured to display a challenge to a subject via the interface, and receive as input a response to the challenge from the subject. Contemporaneous (e.g., simultaneous) to receiving the response to the challenge from the subject, the processing device can be configured to capture one or more images of the subject with the camera. The processing device can be configured to analyze the received response to the challenge relative to a preset valid response, and analyze the captured one or more images of the subject for biometric authenticity. The processing device can be configured to verify the subject based on a combination of both a successful match between the response to the challenge and the preset valid response, and a successful finding of biometric authenticity.

In some embodiments, the interface can include a graphical user interface (GUI) including a display. In some embodiments, the biometric security system can include an illumination source (e.g., a near infrared illumination source) configured to illuminate an iris of the subject. In some embodiments, the challenge can be a request for input of the preset valid response in a form of a numerical or alphanumerical passcode. In such embodiments, the interface can include a numerical display, and the processing device can be configured to provide a signal to the subject for visually entering the numerical passcode using the numerical display of the interface by sequentially focusing on each number of the numerical passcode on the numerical display. The signal can be at least one of a visual signal, an auditory signal, a tactile signal, combinations thereof, or the like.

In such embodiments, the camera can be configured to capture one or more images of the subject during sequential focus of the subject on each number of the numerical passcode. The processing device can be configured to determine a distance of the subject and a gaze angle of the subject relative to the interface based on the one or more captured images. The processing device can be configured to select a number of the numerical display determined to be of focus by the subject based on the distance of the subject and the gaze angle. The processing device can be configured to output a visual indicator regarding the selected number of the numerical display. The processing device can provide a limited time period for the subject to focus on each sequential number of the numerical passcode.

In some embodiments, the interface can include a numerical display, and the processing device can be configured to provide a signal to the subject for visually entering the numerical passcode using the numerical display of the interface by sequentially focusing on each number of the numerical passcode on the numerical display and blinking to sequentially confirm selection of each number. In some embodiments, the interface can include a numerical display, and the processing device can be configured to provide a signal to the subject for visually entering the numerical passcode using the numerical display of the interface by sequentially focusing on each number of the numerical passcode on the numerical display and actuating an input means (e.g., a button) of the interface to sequentially confirm selection of each number. In some embodiments, a fingerprint scanner of the interface can detect a fingerprint of the subject during actuation of the input means.

In some embodiments, for the biometric authenticity, the processing device can be configured to analyze the captured one or more images of the subject using iris segmentation and matching routines. In some embodiments, for the biometric authenticity, the processing device can be configured to measure at least one of a position of an iris of the subject within a socket relative to corners of an eye, a distance of the iris from eyelids of the eye, an eyelid opening distance, eyelid opening movement, a relative position between a pupil of the subject and specular reflection, a size of the specular reflection, combinations thereof, or the like. Such measurements can assist the biometric security system in determining the liveness of the subject.

In some embodiments, the interface can include one or more fingerprint scanners. In such embodiments, the challenge can be a request for input of the preset valid response in a form of an initial position of a finger of the subject against the fingerprint scanner and a subsequent position of the finger of the subject against the fingerprint scanner, the initial and subsequent positions of the finger being different (e.g., different orientations). The processing device can be configured to scan the finger of the subject positioned against the fingerprint scanner in the initial position, and the processing device can be configured to provide a signal (e.g., visual, audio, tactile, combinations thereof, or the like) to the subject for rotating the finger by a preset angle (e.g., preselected by the subject) to the subsequent position. In such embodiments, matching of the preset angle by the subject represents the response to the challenge, and scanning of the fingerprint at both positions represents the biometric authenticity portion.

In some embodiments, for the biometric authenticity, the processing device can be configured to analyze the captured one or more images of the subject for facial expression variation. In some embodiments, for the biometric authenticity, the processing device can be configured to analyze the captured one or more images of the subject for blinking frequency. In some embodiments, for the biometric authenticity, the processing device can be configured to analyze the captured one or more images of the subject for iris texture. The biometric security system can include one or more databases configured to electronically store the response to the challenge from the subject, the captured one or more images of the subject, and the preset valid response.

In accordance with embodiments of the present disclosure, an exemplary method of verification of a biometric security system is provided. The method includes displaying a challenge to a subject via an interface of the biometric security system, and receiving as input a response to the challenge from the subject. The method includes, contemporaneous (e.g., simultaneous) to receiving the response to the challenge from the subject, capturing one or more images of the subject with the camera. The method includes analyzing the received response to the challenge relative to a preset valid response, and analyzing the captured one or more images of the subject for biometric authenticity. The method includes verifying the subject based on both a successful match between the response to the challenge and the preset valid response, and a successful finding of biometric authenticity.

In some embodiments, the method can include illuminating the iris of the subject with an illumination source (e.g., a near infrared illumination source). In some embodiments, the challenge can be a request for input of the preset valid response in a form of a numerical or alphanumerical passcode. In such embodiments, the method can include providing a signal to the subject for visually entering the numerical passcode using a numerical display of the interface by sequentially focusing on each number of the numerical passcode on the numerical display. The method can include capturing one or more images of the subject during sequential focus of the subject on each number of the numerical passcode, determining a distance of the subject and a gaze angle of the subject relative to the interface based on the one or more captured images, and selecting a number of the numerical display determined to be of focus by the subject based on the distance of the subject and the gaze angle. The method can include outputting a visual indicator regarding the selected number of the numerical display.

Determining which of the numbers of the numerical display is selected by the gaze of the subject can be performed by one or a combination of different methods. In some embodiments, a predetermined period of time during which the subject's gaze is detected to hover over a number can be indicative of the desired selection. In such embodiments, the system can indicate to the subject when it is time to move the subject's gaze to the next number. In some embodiments, the system can request the subject to blink after the subject's gaze is hovering over a number to indicate the desired selection, the subject's blink selecting the number and explicitly advancing the system to the next number (if any). In some embodiments, the user interface can include a "next" or "enter" button (physical and/or electronic) that the subject can actuate while the subject's gaze is hovering over a number to indicate the desired selection, actuation of the button selecting the number and explicitly advancing the system to the next number (if any). In some embodiments, actuation of the button can substantially simultaneously capture the number on the numerical display and the subject's fingerprint via a fingerprint scanner embedded in the button, resulting in a multi-biometric characteristic capture within a tight timing tolerance.

In some embodiments, the method can include analyzing the captured one or more images of the subject using iris segmentation and matching routines. In some embodiments, the method can include measuring at least one of a position of an iris of the subject within a socket relative to corners of an eye, a distance of the iris from eyelids of the eye, an eyelid opening distance, eyelid opening movement, a relative position between a pupil of the subject and specular reflection, a size of the specular reflection, combinations thereof, or the like.

In some embodiments, the interface can include a fingerprint scanner, and the challenge can be a request for input of the preset valid response in a form of an initial position of a finger of the subject against the fingerprint scanner and a subsequent position of the finger of the subject against the fingerprint scanner. The method can include scanning the finger of the subject positioned against the fingerprint scanner in the initial position, and providing a signal to the subject for rotating the finger by a preset angle to the subsequent position.

In some embodiments, the method can include analyzing the captured one or more images of the subject for facial expression variation. In some embodiments, the method can include analyzing the captured one or more images of the subject for blinking frequency. In some embodiments, the method can include analyzing the captured one or more images of the subject for iris texture. The method can include electronically storing the response to the challenge from the subject, the captured one or more images of the subject, and the preset valid response in a database.

In accordance with embodiments of the present disclosure, an exemplary non-transitory computer-readable medium storing instructions is provided for biometric security system verification, the instructions being executable by a processing device. Execution of the instructions by the processing device can cause the processing device to display a challenge to a subject via an interface of the biometric security system, and receive as input a response to the challenge from the subject. Execution of the instructions by the processing device can cause the processing device to, contemporaneous (e.g., simultaneous) to receiving the response to the challenge from the subject, capture one or more images of the subject with the camera.

Execution of the instructions by the processing device can cause the processing device to analyze the received response to the challenge relative to a preset valid response. Execution of the instructions by the processing device can cause the processing device to analyze the captured one or more images of the subject for biometric authenticity. Execution of the instructions by the processing device can cause the processing device to verify the subject based on both a successful match between the response to the challenge and the preset valid response, and a successful finding of biometric authenticity.

In accordance with embodiments of the present disclosure, an exemplary biometric security system is provided. The system includes an interface, a biometric acquisition device (e.g., camera, fingerprint scanner, combinations thereof, or the like), and a processing device in communication with the interface and the biometric acquisition device. The processing device configured to display a challenge to a subject via the interface, and receive as input a response to the challenge from the subject. Contemporaneous to receiving the response to the challenge from the subject, the processing device is configured to capture a biometric characteristic of the subject with the biometric acquisition device. The processing device configured to analyze the received response to the challenge relative to a preset valid response, analyze the biometric characteristic of the subject for biometric authenticity, and verify the subject based on both a successful match between the response to the challenge and the preset valid response, and a successful finding of biometric authenticity.

In some embodiments, the challenge can be a request for input of the preset valid response in a form of a numerical passcode, the interface includes a numerical display, and the processing device is configured to provide a signal to the subject for visually entering the numerical passcode using the numerical display of the interface by sequentially focusing on each number of the numerical passcode on the numerical display for a predetermined period of time.

In some embodiments, the biometric acquisition device includes a camera, the camera is configured to capture one or more images of the subject during sequential focus of the subject on each number of the numerical passcode, and the processing device is configured to determine a distance of the subject and a gaze angle of the subject relative to the interface based on the one or more captured images, and wherein the processing device is configured to select a number of the numerical display determined to be of focus by the subject based on the distance of the subject and the gaze angle. In some embodiments, the processing device can be configured to output a visual indicator regarding the selected number of the numerical display. In some embodiments, the processing device can provide a limited time period for the subject to focus on each sequential number of the numerical passcode.

In some embodiments, the challenge can be a request for input of the preset valid response in a form of a numerical passcode, the interface includes a numerical display, and the processing device is configured to provide a signal to the subject for visually entering the numerical passcode using the numerical display of the interface by sequentially focusing on each number of the numerical passcode on the numerical display and blinking to sequentially confirm selection of each number.

In some embodiments, the challenge can be a request for input of the preset valid response in a form of a numerical passcode, the interface includes a numerical display, the processing device is configured to provide a signal to the subject for entering the numerical passcode using the numerical display of the interface by sequentially focusing on each number of the numerical passcode on the numerical display and actuating an input means of the interface to sequentially confirm selection of each number, and the biometric acquisition device includes a fingerprint scanner of the interface configured to detect a fingerprint of the subject during actuation of the input means.

In some embodiments, the challenge can be a request for input of the preset valid response in a form of a numerical passcode, the interface includes a numerical display, the processing device is configured to provide a signal to the subject for entering the numerical passcode using the numerical display of the interface by sequentially actuating each number of the numerical passcode on the numerical display, and the biometric acquisition device includes a fingerprint scanner of the interface configured to detect a fingerprint of the subject during actuation of at least one number of the numerical passcode.

In some embodiments, the processing device is configured to analyze the captured one or more images of the subject using iris segmentation and matching routines. In some embodiments, the processing device is configured to measure at least one of a position of an iris of the subject within a socket relative to corners of an eye, a distance of the iris from eyelids of the eye, an eyelid opening distance, eyelid opening movement, a relative position between a pupil of the subject and specular reflection, or a size of the specular reflection.

In some embodiments, the biometric acquisition device includes a fingerprint scanner, and the challenge is a request for input of the preset valid response in a form of an initial position of a finger of the subject against the fingerprint scanner and a subsequent position of the finger of the subject against the fingerprint scanner. In such embodiments, the processing device can be configured to scan the finger of the subject positioned against the fingerprint scanner in the initial position, and the processing device can be configured to provide a signal to the subject for rotating the finger by a preset angle to the subsequent position.

In some embodiments, the processing device can be configured to analyze the captured one or more images of the subject for at least one of facial expression variation, blinking frequency, or iris texture. In some embodiments, the processing device can be configured substantially simultaneously receive the response to the challenge from the subject and capture the biometric characteristic of the subject with the biometric acquisition device.

In accordance with embodiments of the present disclosure, an exemplary method of verification of a biometric security system is provided. The method includes displaying a challenge to a subject via an interface of the biometric security system, and receiving as input a response to the challenge from the subject. Contemporaneous to receiving the response to the challenge from the subject, the method includes capturing a biometric characteristic of the subject with a biometric acquisition device. The method includes analyzing the received response to the challenge relative to a preset valid response, analyzing the captured biometric characteristic of the subject for biometric authenticity, and verifying the subject based on both a successful match between the response to the challenge and the preset valid response, and a successful finding of biometric authenticity.

In some embodiments, the challenge can be a request for input of the preset valid response in a form of a numerical passcode, and the method includes providing a signal to the subject for visually entering the numerical passcode using a numerical display of the interface by sequentially focusing on each number of the numerical passcode on the numerical display for a predetermined period of time.

In some embodiments, the challenge can be a request for input of the preset valid response in a form of a numerical passcode, and the method includes providing a signal to the subject for visually entering the numerical passcode using a numerical display of the interface by sequentially focusing on each number of the numerical passcode on the numerical display and blinking to sequentially confirm selection of each number.

In some embodiments, the challenge can be a request for input of the preset valid response in a form of a numerical passcode, and the method includes providing a signal to the subject for visually entering the numerical passcode using a numerical display of the interface by sequentially focusing on each number of the numerical passcode on the numerical display and actuating an input means of the interface to sequentially confirm selection of each number, and detecting a fingerprint of the subject with a biometric acquisition device during actuation of the input means.

In some embodiments, the challenge can be a request for input of the preset valid response in a form of a numerical passcode, and the method includes providing a signal to the subject for entering the numerical passcode using a numerical display of the interface by sequentially actuating each number of the numerical passcode on the numerical display, and detecting a fingerprint of the subject with a biometric acquisition device during actuation of at least one number of the numerical passcode.

In some embodiments, the biometric acquisition device includes a fingerprint scanner, and the challenge can be a request for input of the preset valid response in a form of an initial position of a finger of the subject against the fingerprint scanner and a subsequent position of the finger of the subject against the fingerprint scanner, the method including scanning the finger of the subject positioned against the fingerprint scanner in the initial position, and providing a signal to the subject for rotating the finger by a preset angle to the subsequent position.

In accordance with embodiments of the present disclosure, an exemplary non-transitory computer-readable medium storing instructions for biometric security system verification is provided. The instructions are executable by a processing device. Execution of the instructions by the processing device causes the processing device to display a challenge to a subject via an interface of the biometric security system, and receive as input a response to the challenge from the subject. Contemporaneous to receiving the response to the challenge from the subject, execution of the instructions by the processing device causes the processing device to capture a biometric characteristic of the subject with a biometric acquisition device. Execution of the instructions by the processing device causes the processing device to analyze the received response to the challenge relative to a preset valid response, analyze the captured biometric characteristic of the subject for biometric authenticity, and verify the subject based on both a successful match between the response to the challenge and the preset valid response, and a successful finding of biometric authenticity.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed biometric security systems and methods, reference is made to the accompanying figures, wherein.

DESCRIPTION OF EXEMPLARY EMBODIMENTS

In accordance with embodiments of the present disclosure, exemplary biometric security systems are provided that verify a subject based on a combination of a response to a non-biometric challenge and biometric authenticity, thereby increasing the anti-spoofing measures of traditional biometric identification systems. In particular, the exemplary biometric security systems provide additional layers of biometric security by necessitating that the subject possess and use a piece of private information (e.g., a numerical passcode, an alphanumeric passcode, unique credentials, a radio-frequency identification (RFID) card, or the like) contemporaneously (e.g., simultaneously) to biometric authentication when and only when challenged by the system to provide such information (e.g., a response to a challenge). The biometric security systems therefore require that the correct response to a challenge is provided by the subject at a correctly timed moment (a class of challenge and response measures), in combination with biometric identification of the subject. By relying on a multi-layer combination of the properly timed response to a challenge and biometric identification (as opposed to a simple presentation of a biometric feature), the level of difficulty for a spoof attack is increased.

In some embodiments, existing hardware of a biometric identification system can be programmed to present a challenge and interpret the response to the challenge in combination with biometric authentication. The requirement for the correct and correctly timed response to a challenge increases the level of difficulty for a spoof attack without necessitating a large investment in software or even a small investment in hardware for the system. The exemplary biometric security systems can be used in a variety of environments, such as, e.g., smart phones, door locks, ATM machines, home security, corporate security, military security, or the like. By offering an increase in the level of security to self-recognizing systems, the exemplary biometric security systems can be used in any environment requiring heightened security, e.g., for financial transactions, access to sensitive areas, or the like. The exemplary biometric security systems can also be used with lower security systems, e.g., opening smart phones, entry to a home, or the like, by layering a biometric authentication (something that you are) with private personal information (something that you know). The combination of a challenge response with biometric authentication can be applied in a variety of biometric modalities, such as voice, fingerprint, face, and iris identification.

Figure 1:
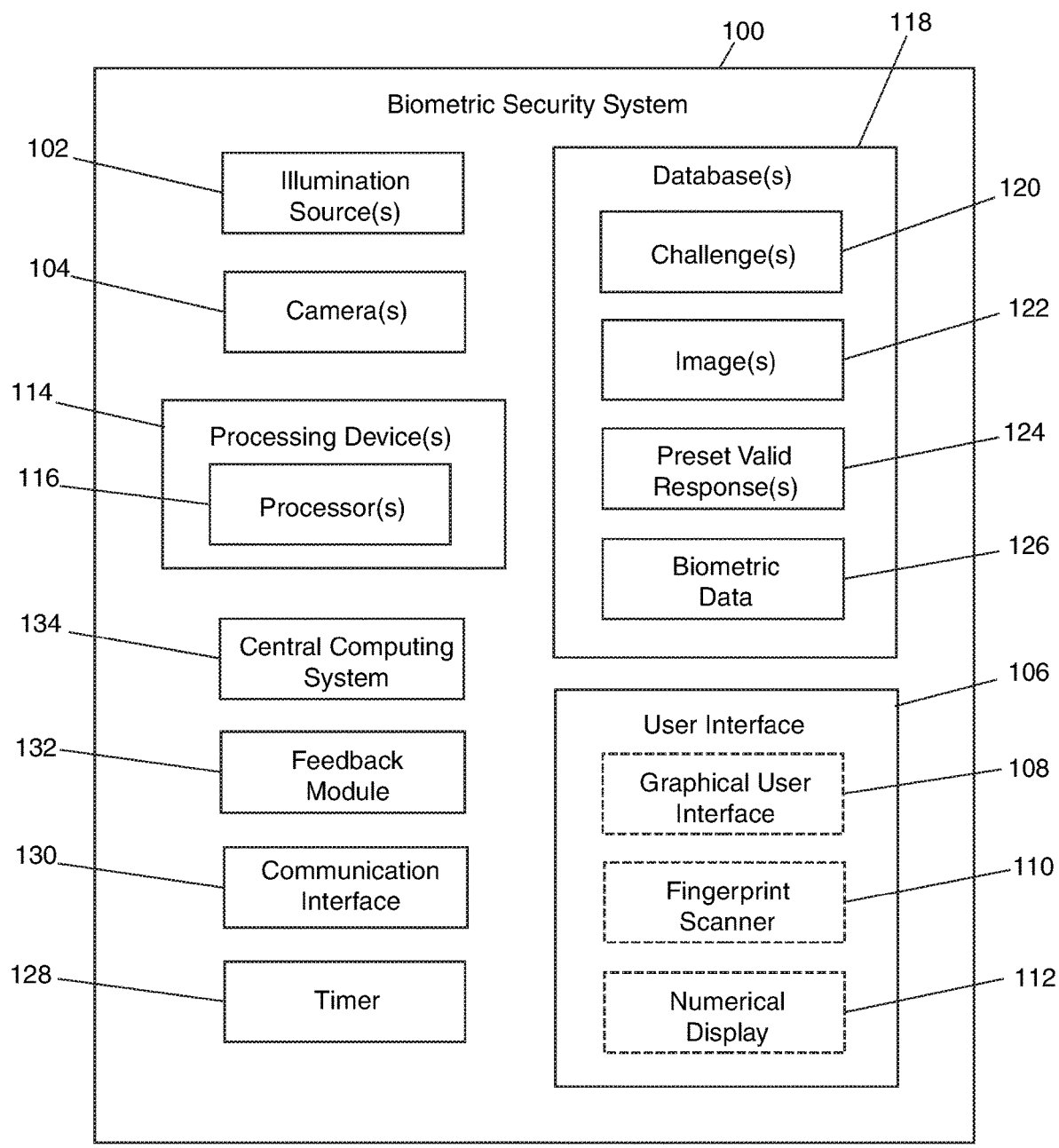
FIG. 1 is a block diagram of an exemplary biometric security system in accordance with the present disclosure.

With reference to FIG. 1, a block diagram of an exemplary biometric security system 100 (hereafter "system 100") is provided. The system 100 generally includes one or more illumination sources 102 configured to illuminate the subject. The illumination sources 102 can be configured to illuminate the entire subject or only specific parts of the subject, such as the face, eye or iris. In some embodiments, the illumination sources 102 can be ambient light in the environment surrounding the subject during use of the system 100. In some embodiments, the illumination sources 102 can be light emitting diodes (LEDs), e.g., LEDs associated with the device implementing the system 100, near infrared light, and the like.

The system 100 includes one or more cameras 104 (e.g., one type of biometric acquisition device) configured to capture images of the subject, such as of the face and/or iris(es) of the subject. The illumination sources 102 and the cameras 104 can be part of a subject acquisition subsystem. The system 100 includes a user interface 106. In some embodiments, the user interface 106 can include a display in the form of a graphical user interface (GUI) 108. In some embodiments, the interface 106 can include a fingerprint scanner 110 for scanning one or more fingers of the subject. In some embodiments, the interface 106 can include a numerical (or alphanumerical) display 112. In some embodiments, the display 112 can be provided to the subject electronically via the GUI 108.

The system 100 includes a processing device 114 with a processor 116 in communication with the user interface 106, the camera 104 and the illumination source 102. The system 100 includes one or more databases 118 configured to electronically store a variety of data, such as one or more challenges 120 that can be presented to the subject via the interface 106, one or more images 122 captured by the camera 104, preset valid responses 124 to the challenges 120, and biometric data 126 associated with one or more subjects. For example, when initially enrolling into the system 100, the subject can be provided with one or more challenges 120 and can provide responses to such challenges 120. The correct responses to the challenges 120 can be stored as the preset valid responses 124 for matching at a future verification stage of the subject. The responses to the challenges 120 can be customized by the subject and can be changed by the subject when desired. The revocable nature of the responses to the challenges 120 allows the subject to vary the verification process if the passcode or biometric characteristics have been compromised.

As a further example, during initial enrollment into the system 100, one or more images 122 of the subject can be captured by the system 100, biometric identification information can be extracted from the one or more images 122, and stored as the biometric data 126. Thus, the database 118 can electronically store historical data from enrollment of the subject into the system 100, historical data associated with previous verification of the subject by the system 100, and/or real-time data associated with an attempt of the subject to be verified by the system 100.

The system 100 can include a timer 128 in communication with the processing device 114. The timer 128 can be used by the system 100 to ensure that the response to the challenge 120 is provided by the subject in a timely manner (e.g., within a predetermined period of time). The system 100 can include a communication interface 130 configured to provide for a communication network between components of the system 100, thereby allowing data to be transmitted and/or received by the components of the system 100. The system 100 can include a central computing system 132 for receiving and processing the data captured by the camera 104 and transmitted by the processing device 114. The system 100 can include a feedback module 134 configured to provide feedback to the subject regarding, for example, a request for response to a challenge 120, proper alignment of the subject with the field-of-view of the camera 104, a specific step to be taken by the subject during response to a challenge 120, combinations thereof, or the like. In some embodiments, the feedback module 134 can be configured to provide visual, auditory, and/or tactile feedback to the subject.

Security of a biometric self-recognizing system is strengthened by a challenge/response based on the necessity of the authentic subject to know how to respond to the challenge (e.g., the correct passcode), and for the authentic subject to know when to respond to the challenge (a temporal requirement). Because of the purposeful nature of a challenge and response, the system 100 uses both something a user knows (e.g., a passcode) and something a person is (e.g., a biometric characteristic), rather than just the latter. The system 100 can initiate the verification step with an alignment phase where the subject is guided (e.g., via the feedback module 132) into the proper capture position for entering digits, a pattern, or other information that can be readily changed by the subject (e.g., responses to a challenge). Contemporaneous (e.g., simultaneous) to entry of such information by the subject, the system 100 captures and analyzes one or more biometric characteristics of the subject. The period of time when the challenge response and biometric information is provided or extracted can be identified as the entry phase. Upon successful entry of the subject defined information and biometric information, the system 100 can make a decision to grant or deny access to the subject. The security can be derived from the fusing of subject defined keys, biometric credentials, and time limitations.

Thus, the system 100 can be configured to initially display a challenge 120 to the subject via the interface 106. In some embodiments, the challenge 120 can be to enter a numerical or alphanumerical passcode stored as a preset valid response 124 by sequentially following the numbers and/or letters of the passcode on a numerical or alphanumerical display provided at the interface 106 with one or more eyes of the subject. In such embodiments, the timer 128 can be used to provide the subject with a limited amount of time to gaze at the next number or letter in the passcode and, once selected, the feedback module 132 can be used to provide feedback to the subject to continue to the next number or letter of the passcode. In some embodiments, the challenge 120 can be to gaze at predetermined images or icons presented to the user at the interface 106 in a specific order. In some embodiments, the challenge 120 can be to position the subject's finger in a first orientation against the fingerprint scanner 110 (e.g., one type of biometric acquisition device) and, after a signal from the feedback module 132, rotate the finger by a predetermined angle to be scanned again by the fingerprint scanner 110. The system 100 is therefore configured to receive as input a response to the challenge 120 from the subject, whether in the form of the sequentially followed numbers and/or letters of the passcode or the correct change in angle of the finger for subsequent scanning. The received response to the challenge 120 can be analyzed and/or compared to the preset valid response 124 stored in the system 100.

Contemporaneous (e.g., simultaneous) to receiving the response to the challenge 120, the system 100 can be configured to capture one or more images 122 of the subject with the camera 104. For example, the camera 122 can capture images 122 of the iris of the subject. The images 122 can be analyzed by the system 100 for biometric authenticity. In some embodiments, biometric authenticity can be performed by iris segmentation and matching routines. In some embodiments, biometric authenticity can be performed by measurement of at least one of a position of an iris of the subject within a socket relative to corners of the eye, a distance of the iris from eyelids of the eye, an eyelid opening distance, eyelid opening movement, a relative position between a pupil of the subject and specular reflection, a size of the specular reflection, combinations thereof, or the like.

In some embodiments, biometric authenticity can be performed by facial expression variation, blinking frequency, iris texture, or the like, as analyzed and extracted from the images 122. In some embodiments, biometric authenticity can be performed by scanning the fingerprint of the user via the scanner 110. Thus, while the subject is providing the response to the challenge 120, the system 100 can use the captured images 122 to contemporaneously (e.g., simultaneously) determine the biometric authenticity of the subject. Based on both a successful match between the response to the challenge 120 and the preset valid response 124, and a successful finding of biometric authenticity, the subject can be verified by the system 100.

As noted above, in some embodiments, the challenge 120 presented to the subject can be a request for input of the preset valid response 124 in the form of a numerical or alphanumerical passcode. In some embodiments, the user interface 106 can initially display the subject's eye for alignment until the subject is in the capture volume or field-of-view of the camera 104. Once the subject is in the capture volume, the display can switch from an eye preview to an entry display capable of receiving input from the subject. In some embodiments, the GUI 108 can display a numeric or alphanumeric digital display to the subject for visually entering a preset passcode. For example, a possible entry display can be a 12-digit numeric keypad (e.g., an array of digits).

The processing device 114 can provide a signal (e.g., visual, auditory, tactile, combinations thereof, or the like) to the subject via the feedback module 132 to begin visually entering the passcode using the display provided on the interface 106. The subject can begin entering their personal identification number or passcode by sequentially looking at each number and maintaining their gaze on each number until notified by the system 100 to move their gaze to the next number. During the subject's gaze at each of the numbers or letters of the passcode on the display, the system 100 can capture one or more images 122 of the subject with the camera 104.

The processing device 114 can be configured to analyze each image substantially in real-time while the subject is maintaining their gaze on a specific number on the display to determine the distance of the subject and the gaze angle of the subject relative to the interface 106. Based on the calculated distance to the display and the gaze angle on every frame captured, the system 100 determines which of the numbers in the numerical display the subject was focusing on. The system 100 can output feedback in the form of a visual indicator (e.g., highlighting, bold, different color, flashing, or the like) on the interface 106 regarding the number determined by the system 100 to be of focus by the subject (e.g., the number the subject was looking at). Such feedback indicates to the subject that the digit or letter has been accepted and it is time to look at the subsequent digit or letter in the passcode. In particular, once the system 100 determines that the subject is staring at a specific number, the system 100 can simulate depression of the digit on the screen and provides the feedback to the subject. Selection of each digit can therefore be performed visually without physical depression on the display by the subject. In some embodiments, in addition to the above-described feedback, the feedback module 132 can provide a visual, auditory and/or tactile signal to the subject, indicating that the subject should focus their gaze on the next number in the passcode.

By requiring the subject to use their eyes to select the digit, the system 100 is able to determine who is entering the information into the system 100 with higher confidence. In particular, contemporaneously (e.g., simultaneously) to detecting the response to the challenge 120 from the subject, the system 100 can analyze the captured images 122 to determine biometric identification of the subject. The system 100 is able to gain the confidence by measuring multiple features of the acquired images 122. In some embodiments, iris segmentation and matching routines can be used to verify the identity of the believed subject. Measuring additional features of the eye, such as the position of the eye within the socket relative to the corners of the eyes, distance from the eyelids, eyelid opening, relative position between the pupil and specular reflection, size of the specular reflection, or other features, can increase the confidence that the eye is an authentic three-dimensional eye.

In some embodiments, if the subject moves out of the capture volume or field-of-view of the camera 104, the system 100 can detect such movement and can reset the sequence of responding to the challenge 120 and determining biometric authenticity. In some embodiments, if the subject moves out of the capture volume or field-of-view of the camera 104, the system 100 can alert the subject to move back into the field-of-view of the camera 104 and allows the subject to continue where the verification sequence left off. Leaving the capture volume may be indicative of someone attempting to spoof the system 100. Therefore, waiting until the subject is near the center of the capture volume or field-of-view of the camera 104 provides an extra buffer against small movements. Keeping the subject near the center of the field-of-view of the camera 104 should be simple since the subject is generally only shifting their eyes, thereby maintaining the proper distance, angle, reflections, or the like, during analysis by the system 100.

Time should be used to limit the entry of each piece of information (e.g., numbers for a numerical passcode), preventing an attacker from getting lucky with each required input. For example, an attacker shifting a piece of paper around may be able to accomplish the correct gaze periodically. However, the time to accomplish the correct gaze and to be able to hold that position is more challenging for an attacker than for an authentic eye. Security is therefore increased by reducing the time allowed between gaze positions. Such time limits can be enforced by the timer 128. Additionally, security can be increased by using longer sequences of digits for the passcode to be entered by the subject.

In some embodiments, the time between verification attempts can be limited by the timer 128. For example, if a subject makes a mistake during the verification process, or an attacker fails to accomplish the entire sequence correctly, the system 100 can allow an immediate retry. After a small number of retries (e.g., two retries), the system 100 can require a long pause before additional attempts are allowed to ensure that the number of attack sequences per day is limited. For example, in some embodiments, the system 100 can require that the subject wait one hour before attempting the verification process again after three incorrect sequences. Security can be increased by allowing fewer retries and necessitating longer pauses between verification attempts.

Thus, in some embodiments, a predetermined period of time during which the subject's gaze is detected to hover over a number can be indicative of the desired selection. In such embodiments, the system 100 can indicate to the subject when it is time to move the subject's gaze to the next number. In some embodiments, the system 100 can request the subject to blink after the subject's gaze is hovering over a number to indicate the desired selection, the subject's blink selecting the number and explicitly advancing the system 100 to the next number (if any). In some embodiments, the user interface 106 can include a "next" or "enter" button (physical and/or electronic) that the subject can actuate while the subject's gaze is hovering over a number to indicate the desired selection, actuation of the button selecting the number and explicitly advancing the system 100 to the next number (if any). In some embodiments, actuation of the button can substantially simultaneously capture the number on the numerical display and the subject's fingerprint via a fingerprint scanner 110 embedded in the button of the user interface 106, resulting in a multi-biometric characteristic capture within a tight timing tolerance. In some embodiments, one or more fingerprint scanners 110 can be embedded into the user interface 106 such that each respective fingerprint scanner 110 underlies a button associated with the user interface 106. In such embodiments, the challenge issued to the subject can be to enter a security code using the physical or electronic numerical display of the user interface 106, and the system 100 can capture the subject's fingerprint via the fingerprint scanner 110 simultaneous to actuation of the button(s).

In some embodiments, the subject could enter their passcode using two or more fingers. In some embodiments, a first finger (associated with a first fingerprint) is used to enter a first digit of a passcode and a second finger different than the first finger (and which is associated with a second fingerprint different than the first fingerprint) can be used for a second digit. For example, if a pin has four digits (e.g., 5-7-6-8), a first finger (e.g., the left index finger) could be used to enter a first digit (e.g., the third position digit, in this example a "6"), a second finger different than the first finger (e.g., the right index finger or the left thumb) could be used to enter a second digit (e.g., the first position, in this example a "5"). Increased complexity could be provided, for example, such that a different finger is used for different digits (e.g., six different fingerprints for six different digits).

In some embodiments, rather than asking the subject to gaze at each individual number of a passcode, the challenge 120 can involve directing the subject to swipe their pupil through a pattern by moving a device of the system 100 vertically and/or horizontally or tilting the device to sweep the pattern. Similar to a swipe pattern entered by using a finger, this pattern can be changed at any time by the user. The key to security is contemporaneous (e.g., simultaneous) iris capture and verification throughout the entry of the swipe motion. Longer patterns can increase overall security. The time to complete the pattern and the time allowed between attempts can be used to strengthen security of the system 100.

In some embodiments, the system 100 can apply variations in the type of biometric authentication used during the subject's response to the challenge 120. In some embodiments, the system 100 can change the position of the illumination source 102 (or change the direction of the illumination beam) to force a change in position of the specular reflection(s), and using such changes in position of the specular reflection(s) to determine if the eye has a three-dimensional shape. In some embodiments, such change in illumination can be performed by rotating a mobile device which would move the position of the illumination source 102 and the rotation angle of the camera 104. In embodiments using multiple illumination sources 102 and/or cameras 104, different patterns of illumination can be switched on or off to logically move and change the illumination position.

In some embodiments, the challenge 120 presented to the subject can be a request for input of the preset valid response 124 in the form of an initial position of a finger of the subject against the fingerprint scanner 110, and a signal to orient the finger in a different, subsequent position for an additional scan of the finger. For example, the subject can initially position the finger against the scanner 110 in any orientation with the system 100 designating the initial position as a zero angle position. Upon receiving a signal from the feedback module 132 directing the subject to change the position of the finger (e.g., the challenge 120), the subject can rotate the finger on the platen by a predetermined amount. In such embodiments, the angle and/or direction of rotation can be previously stored as the preset valid response 124 to the challenge 120.

Upon receiving the signal, the subject can have a limited amount of time to reposition the finger and stabilize the position of the finger in the new orientation. For example, a subject can present a right index fingerprint and, when an LED on the scanner 110 turns green prompting the subject to reorient the finger, the subject can rotate the finger by approximately 45 degrees counterclockwise. Another subject can rotate the finger by approximately 45 degrees clockwise. The angle and/or direction of rotation therefore serves as the response to the challenge 120, while the actual scan of the fingerprint in both orientations serves as the biometric authentication of the subject.

A subject's face is much more expressive than a fingerprint. For example, in response to a challenge 120, a subject can frown, smile or look surprised. The system 100 can analyze the captured images 122 to determine such variations in the subject's face during presentation of a challenge 120 and response to the challenge 120. Although discussed herein as variations to the system 100, it should be understood that the system 100 can use any combinations of challenges 120 and biometric authentication described herein for verifying the subject.

Iris recognition can also be used for verification by the system 100. For example, the eye is well adapted for looking left, right, up, down and for blinking. An eye can trace a swipe pattern on a grid presented on a screen of the interface 106, with the gaze being tracked using gaze tracking technology. An eye can blink once slowly and once rapidly or, could spell a password in Morse code. Iris recognition can be used to recognize the fine details of a subject's iris texture. Thus, the system 100 can use iris recognition to discern whether the subject is properly fixated in the proper direction with eyes open. Based on the captured images 122, the system 100 can detect and analyze a forward gaze, an open-eyed gaze, eye blinks, and off-axis gaze angles as a response to a challenge 120.

The system 100 therefore provides a biometric means for responding to a challenge 120. As noted above, challenges 120 can be presented in a variety of ways through visual, auditory and/or tactile signals from the feedback module 132 and/or the interface 106. For example, in the fingerprint example of the challenge 120, illuminating an LED of the system 100 green can signal the request for the subject to begin the response to the challenge (e.g., rotating the finger by the appropriate angle and the correct direction). As another example, a face or iris recognition system can present a pattern over which a subject gazes using a subject-specific pattern while being gaze-tracked.

An iris recognition system can, in the course of requiring the subject to look toward the iris camera 104, present a challenge (e.g., an LED, a display indicator, a sound, a tactile buzz or vibration, or the like), at which time the subject simply blinks once or briefly looks off in a subject-specific direction and then back at the camera 104. Variations in the gaze angle or direction can therefore be used as the response to the challenge 120. The responses to the challenge 120 are tracked for being during an appropriate time frame monitored by the system 100 to ensure that the response meets the temporal requirements of the response.

Figure 2:
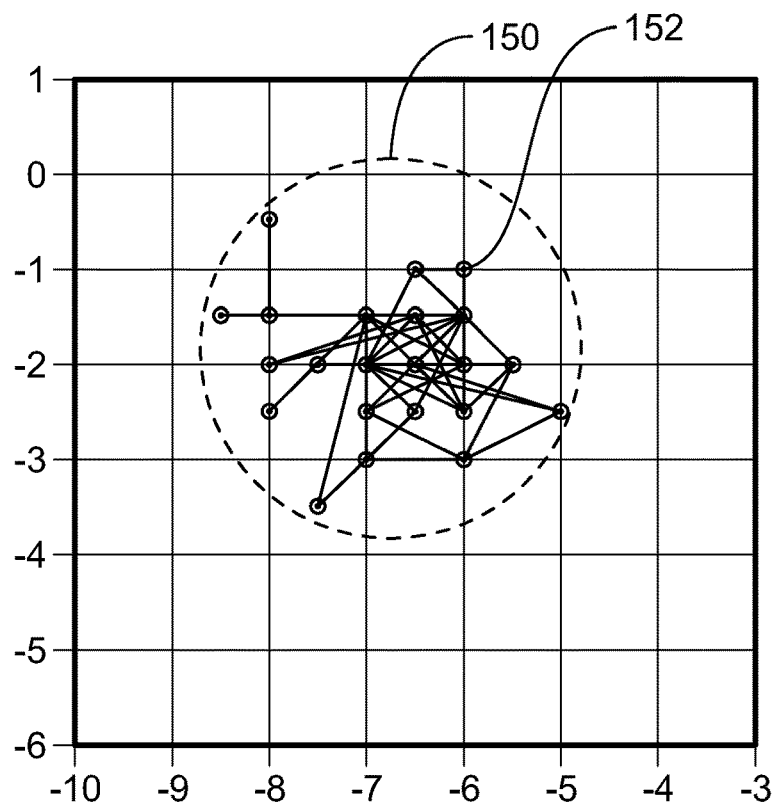
FIG. 2 is a diagrammatic representation of gaze tracking performed by an exemplary biometric security system during a substantially unchanging gaze.
Figure 3:
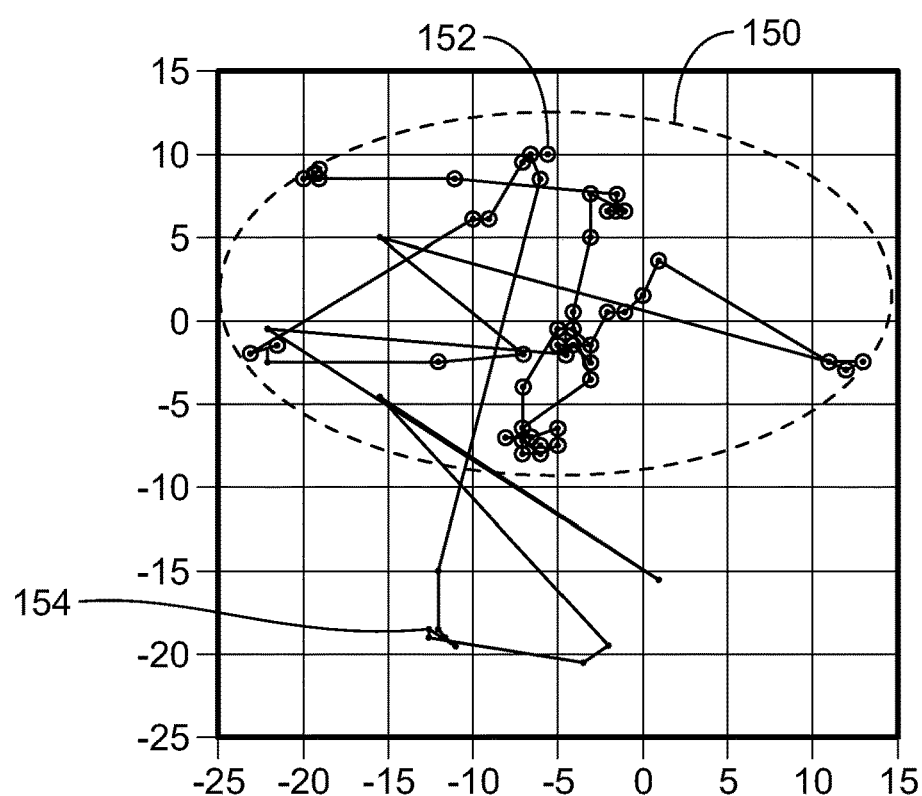
FIG. 3 is a diagrammatic representation of gaze tracking performed by an exemplary biometric security system during a changing gaze.

FIGS. 2 and 3 show diagrammatic representations of gaze tracking performed by the system 100 during the verification process. For gaze tracking, the measure of the gaze angle can be equal to the vector from the center of the specular reflection to the center of the pupil. The diagrammatic representations of FIGS. 2 and 3 are for a subject having the vector of approximately 20 cm. Each point 152 represents the detected gaze of the subject from a captured image 122, and the dashed circle 150 encircles points 152 that have matched with the request from the challenge 120. Thus, multiple images 122 can be captured and analyzed to receive multiple points 152 to determine whether the subject has met the preset valid response 124.

FIG. 2 shows a live eye of the subject trained on a fixed target. In particular, FIG. 2 shows a substantially unchanging gaze of the subject with matching points 152 being within a ±2 pixel radius of the center. Variation in the measured angle can due to error of measurement, unintentional eye motion, or both. FIG. 3 shows a live eye of the subject that is intentionally shifting the gaze angle in an exaggerated manner. In particular, FIG. 3 shows a changing or shifty-eyed transaction with a moving gaze. The matching circle 150 encircles matching points 152 within ±20 pixels horizontally and ±10 pixels vertically, and points 154 are shown to be outside of the matching circle 150. The angle spans a considerably wider range than in FIG. 2 and suggests that the shifting gaze angle can be measured above the noise.

Figure 4:
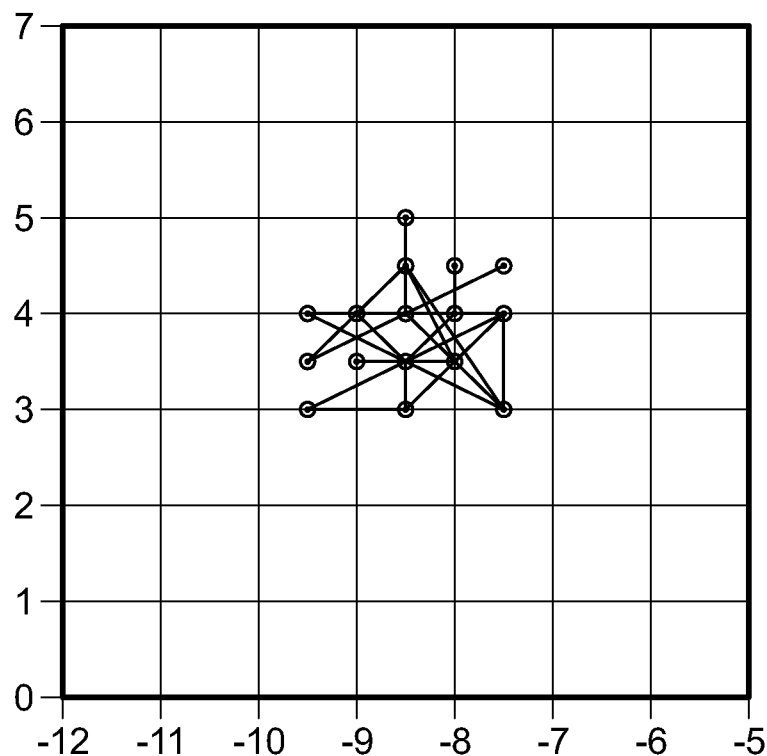
FIG. 4 is a diagrammatic representation of gaze tracking performed by an exemplary biometric security system on a stationary spoof image.
Figure 5:
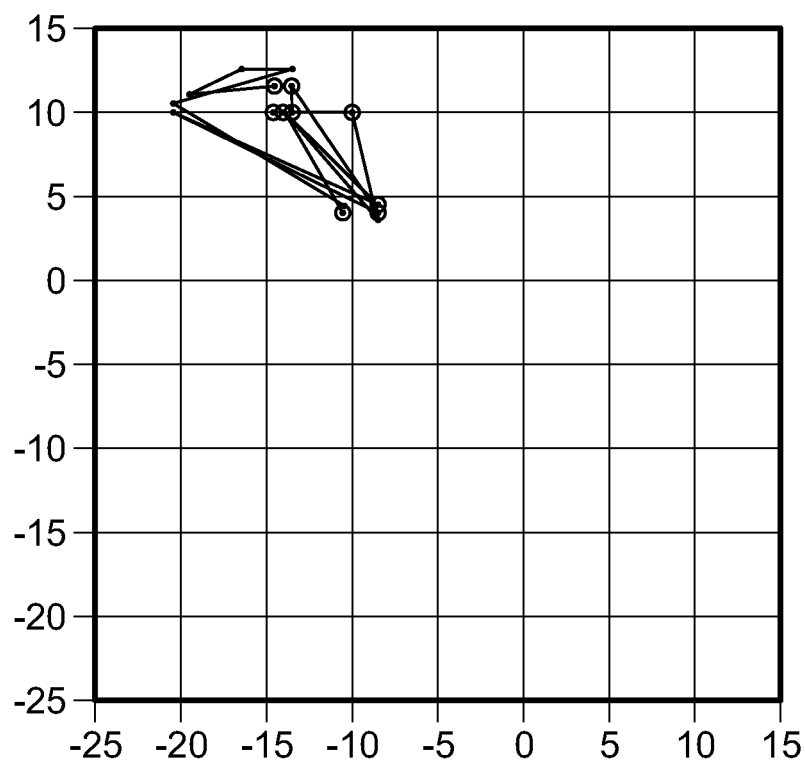
FIG. 5 is a diagrammatic representation of gaze tracking performed by an exemplary biometric security system on a moving spoof image.
Figure 6:
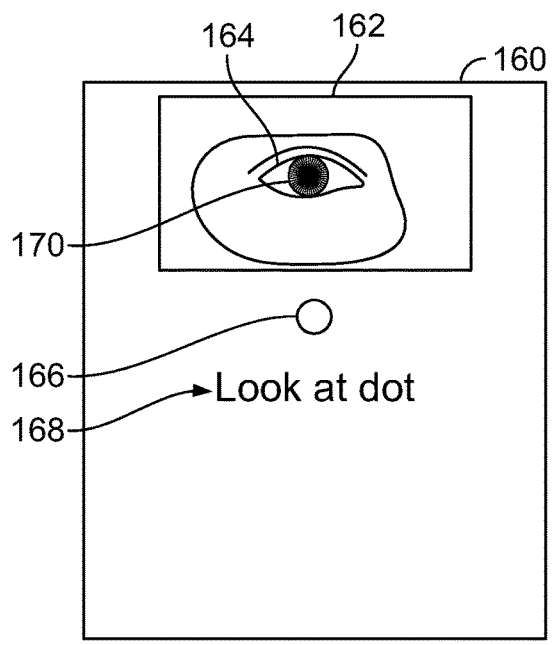
FIGS. 6-9 are diagrammatic representations of a user interface of an exemplary biometric security system including a gaze tracking feature.
Figure 7:
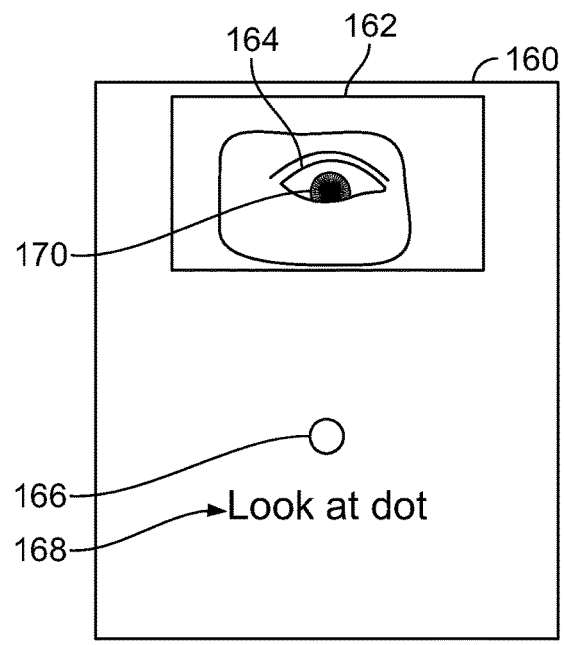
Figure 8:
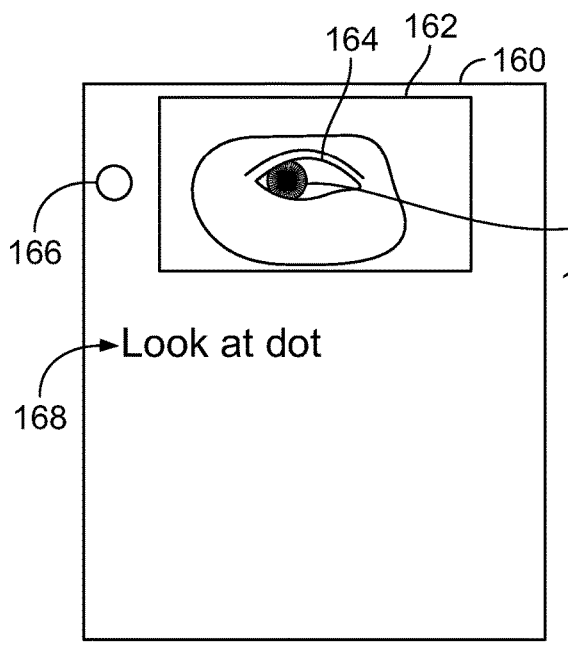
Figure 9:
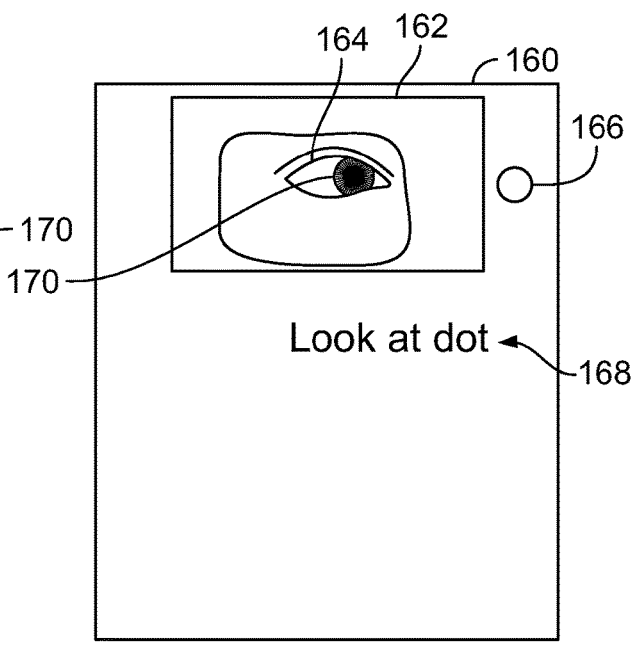

FIGS. 4 and 5 show diagrammatic representations of gaze tracking by the system 100 as a liveness metric. To serve as a liveness metric, the system 100 can distinguish gaze tracking of a human eye from a stationary or moving spoof image. For example, FIG. 4 shows gaze tracking of a stationary spoof image, and FIG. 5 shows gaze tracking of moving spoof image. FIGS. 2-5 illustrate the ability of the system 100 to induce motion of a live eye using cues that would be easy to respond to in a timely manner as a live human would do, but would be difficult to arrange as an appropriate response with a spoof image. Particularly, it would be difficult to replicate or arrange the movement of the gaze angle and all of its characteristics expected from a live eye with a spoof eye. The combination of the challenge and response as measured by gaze tracking can therefore be used to distinguish between characteristics of a live eye and a spoof image.

FIGS. 6-9 are diagrammatic representations of a user interface 160 of the system 100. The user interface 160 can include a display 162 providing a visual representation of the eye 164 of the subject as captured in real-time by the camera 104. The user interface 160 can include a gaze attractor 166 (e.g., a dot) capable of changing positions on the user interface 160. The user interface 160 can include a prompting section 168 configured to provide prompts to the subject regarding the presented challenge 120. In FIGS. 6-9, the prompt is to follow the gaze attractor 166 as the positions of the gaze attractor 166 vary on the interface 160. The system 100 is configured to track the position of the iris 170 as the eye 164 of the subject follows the changing positions of the gaze attractor 166.

In some embodiments, the system 100 can combine a variety of liveness measures. For example, the system 100 can monitor the change in biometric characteristics of the iris 170 in response to the command or prompt to look down at the gaze attractor 166 and tracks the downward movement of the eye 164 and/or iris 170 as the subject follows the position of the gaze attractor 166. In some embodiments, the system 100 can select the different positions of the gaze attractor 166 randomly. The subject can therefore be directed to gaze and stare at the gaze attractor 166 in each position for a predetermined period of time, with the subject moving the gaze and staring at the gaze attractor 166 with each change in position. During the subject's focused gaze for the predetermined period of time, the system 100 can check the gaze angle relative to the interface 160. The biometric characteristics of the subject can be contemporaneously (e.g., simultaneously) measured, particularly in downward gazes. For example, in downward gazes, the gaze angle changes and the eyelid begins to naturally close substantially simultaneously, making it difficult to perform biometric analysis in the form of iris recognition. The combined and contemporaneous (e.g., simultaneous) measurement of change in gaze and biometric characteristics increases the overall security of the system 100, even in instances where the eyelid closes as the gaze angle changes.

Figure 10:
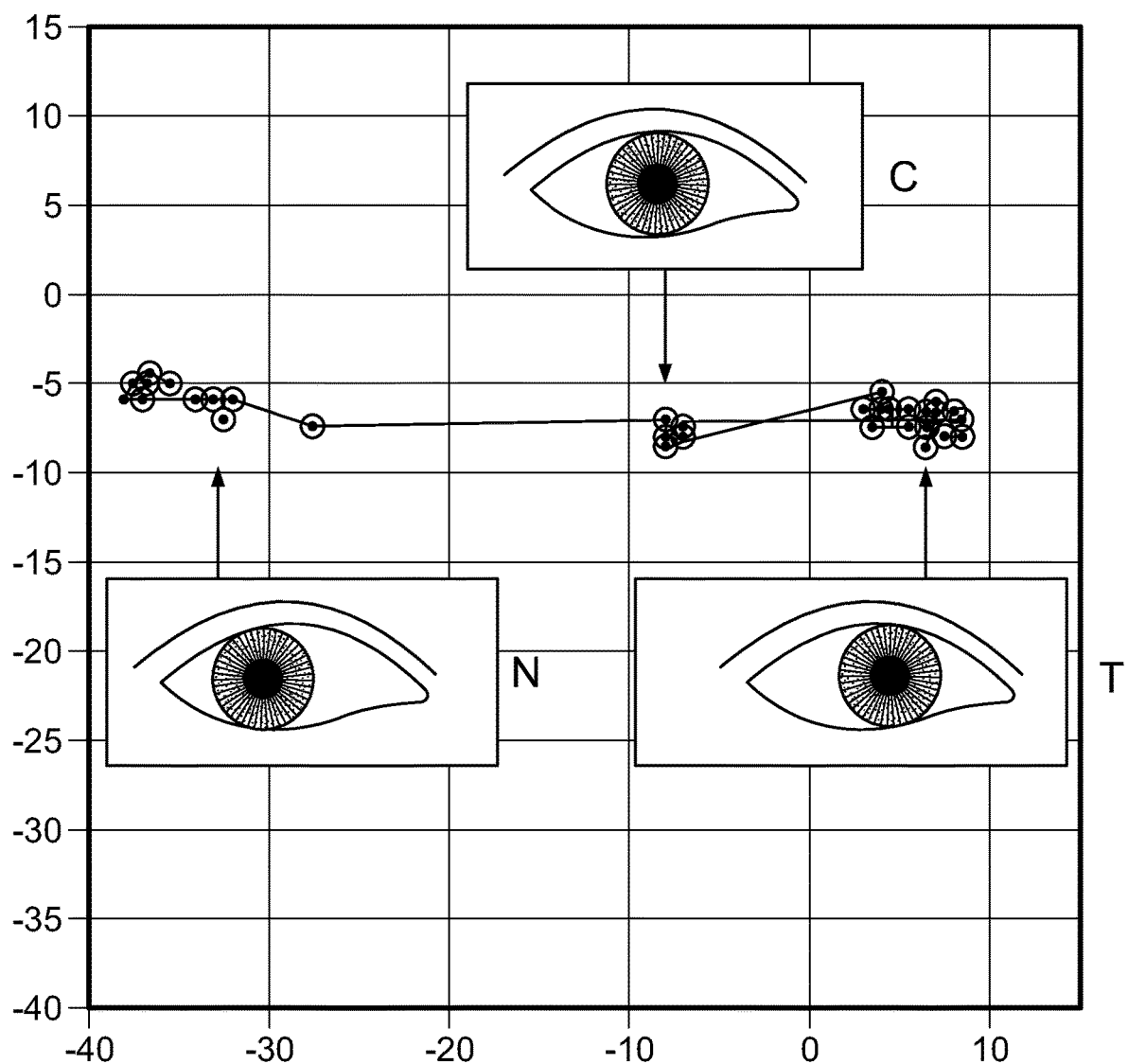
FIG. 10 is a diagrammatic representation of gaze tracking of an exemplary biometric security system for a centered gaze, a nasal gaze, and a temporal gaze.
Figure 11:
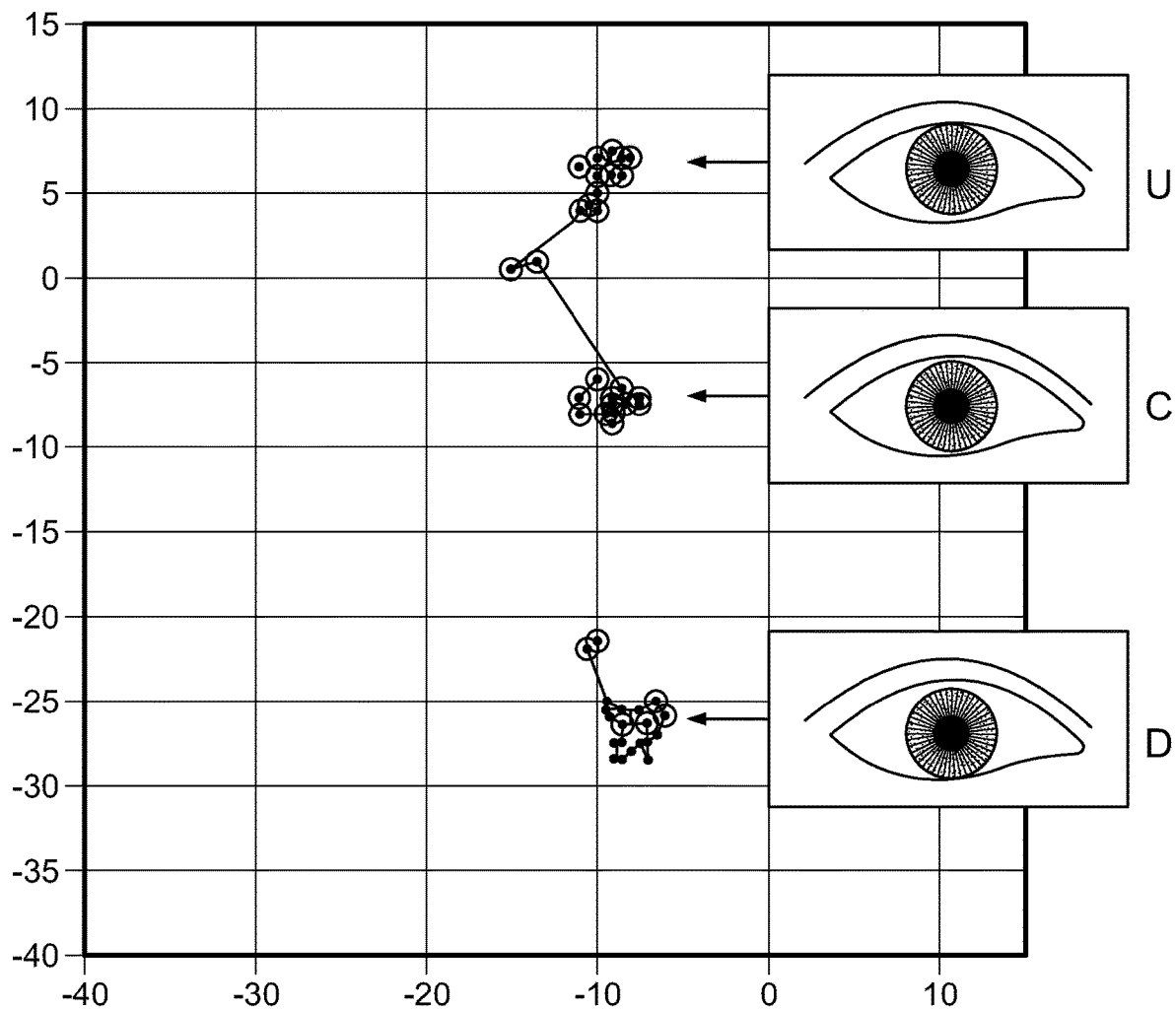
FIG. 11 is a diagrammatic representation of gaze tracking of an exemplary biometric security system for an upward gaze, a centered gaze, and a downward gaze.

FIGS. 10 and 11 are diagrammatic representations of gaze tracking of the system 100 for a variety of gazes. For each gaze, one or more points can be captured and analyzed by the system 100 to ensure the accuracy of the gaze. In some embodiments, the subject can stare at a fixed point provided on the user interface 106 for approximately one second and the position of the point or gaze attractor can be changed in a random pattern, with each position being monitored by the system 100. As an example, the pattern can be from center to left, from left to right, from right to center, from center to up, and from up to down.

For example, FIG. 10 shows the gaze of the subject at the center position (C), a temporal position (T) (e.g., left), and a nasal position (N) (e.g., right). FIG. 11 shows the gaze of the subject at the up position (U), the center position (C), and the down position (D). Points of fixation can be bounded within approximately ±2 pixels for the center, up and down positions, and can be bounded within a slightly larger pixel range for nasal and temporal positions. In some embodiments, the total range for the horizontal gaze direction can be approximately ±20 pixels and approximately ±10 pixels in the vertical gaze direction.

Figure 12:
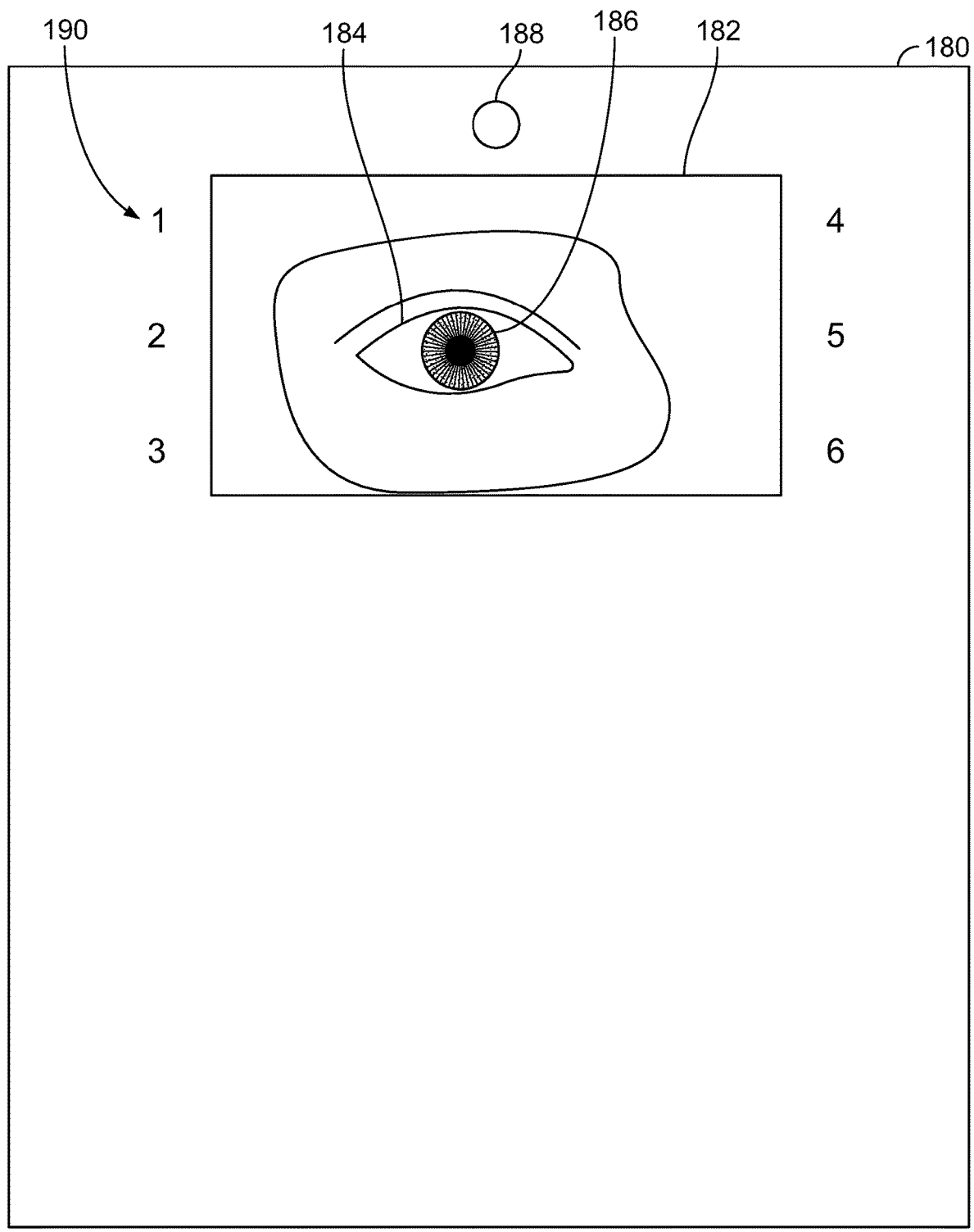
FIG. 12 is a diagrammatic representation of a user interface of an exemplary biometric security system for passcode input.

FIG. 12 is a diagrammatic representation of a user interface 180 of the system 100 for visually receiving input of a passcode. The user interface 180 can include a display 182 showing a real-time representation of the eye 184 and iris 186 of the subject. The user interface 180 includes a camera 188 configured to track the change in gaze of the eye 184 and capture one or more images that can be used for biometric authentication during input of the passcode. The user interface 180 includes a numerical pad or display 190 for visual input of the unique passcode. Although shown as including only six numbers, it should be understood that the numerical display 190 can include more or less numbers, and can further include alphanumeric characters. In some embodiments, the user interface 180 can scramble the position of the numbers of the numerical pad or display 190 in a randomized manner each type a verification process is performed, thereby necessitating different patterns of gazing each time when entering the passcode. Such scrambling can assist in increasing the security of the system 100, since a potential spoofer would need to have a view of both the user's eyes and the scrambled display 190 on each authentication attempt to correlate the two, complicating the potential for a spoof attack.

The subject can be prompted to sequentially gaze from number to number to input the unique personal identification number, e.g., 1-2-3-4, while maintaining the gaze at each number for a predetermined period of time, e.g., one second. The system 100 can monitor the subject's gaze position to accept or reject the input passcode, while contemporaneously (e.g., simultaneously) verifying the subject's identity using iris recognition. The contemporaneous (e.g., simultaneous) combination of input of visual input of a passcode and biometric authentication in the form of iris recognition provides a multiple layer defense against spoofing.

Figure 13:
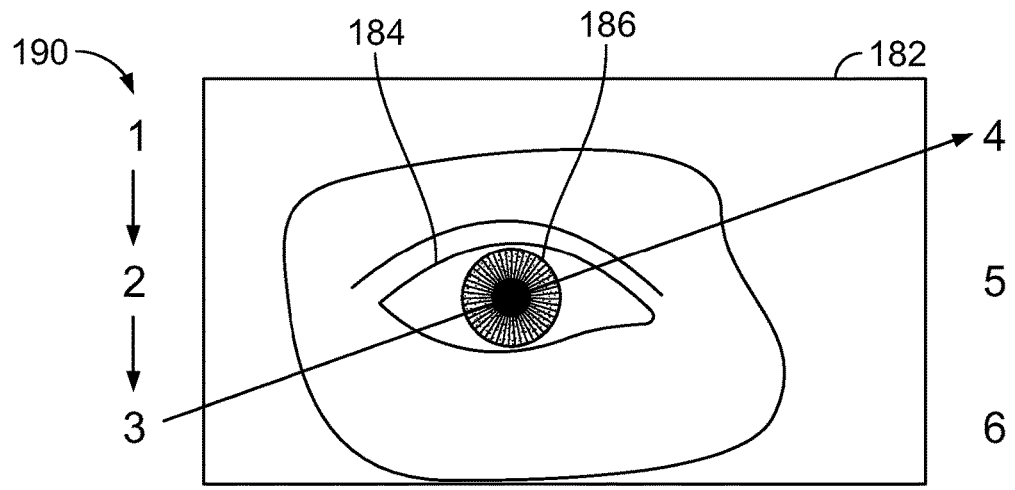
FIGS. 13 and 14 are diagrammatic representations of gaze tracking at a user interface of an exemplary biometric security system during passcode input.
Figure 14:
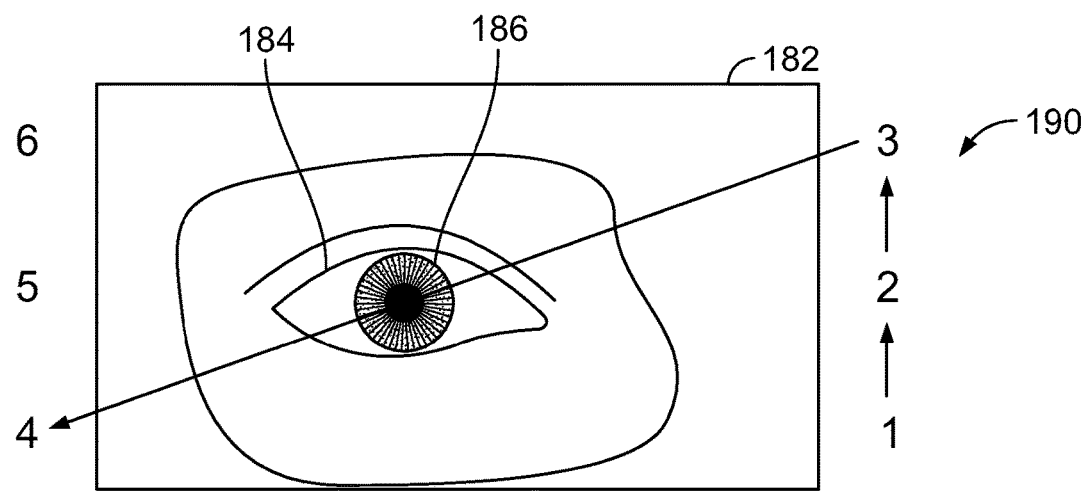

FIGS. 13 and 14 show examples of visual input of the unique passcode using the interface 180. The arrows show the detected gaze positions that correspond to the sequential movement of the iris 186 from number to number of the passcode. Images can be acquired by the camera 188 at a video rage (e.g., approximately 15 frames/second), with gaze direction and iris recognition occurring at the same time. In some embodiments, the numerical display 190 can be varied in a rational way between each verification process. For example, FIG. 14 shows the numerical display 190 with numbers positioned in an opposite direction from the numerical display 190 of FIG. 13. Such variation results in a change in trajectory of the gaze position, increasing the level of spoof difficulty.

Figure 15:
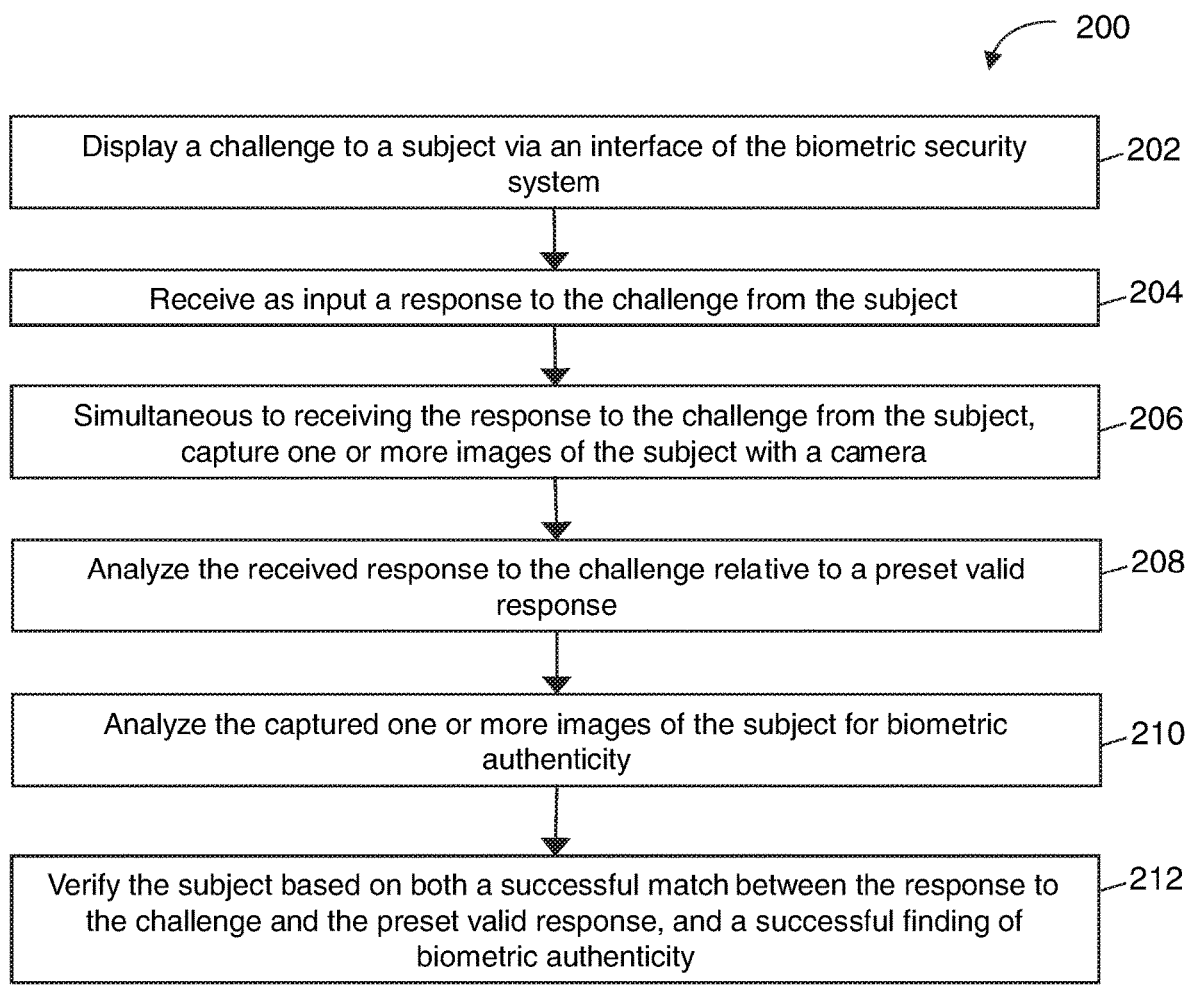
FIG. 15 is a flowchart illustrating an exemplary process of implementing an exemplary biometric security system in accordance with the present disclosure.

FIG. 15 is a flowchart illustrating an exemplary process 200 of implementing the biometric security systems disclosed herein. To begin, at step 202, a challenge is displayed to a subject via an interface of the biometric security system. At step 204, a response to the challenge is received as input from the subject. At step 206, contemporaneous (e.g., simultaneous) to receiving the response to the challenge from the subject, one or more images of the subject are captured with a camera. At step 208, the received response to the challenge is analyzed relative to a preset valid response to ensure the response is correct. In some embodiments, the response to the challenge can be limited temporally. At step 210, the captured one or more images of the subject are analyzed for biometric authenticity. At step 212, the subject is verified on both a successful match between the response to the challenge and the preset valid response, and a successful finding of biometric authenticity.

Figure 16:
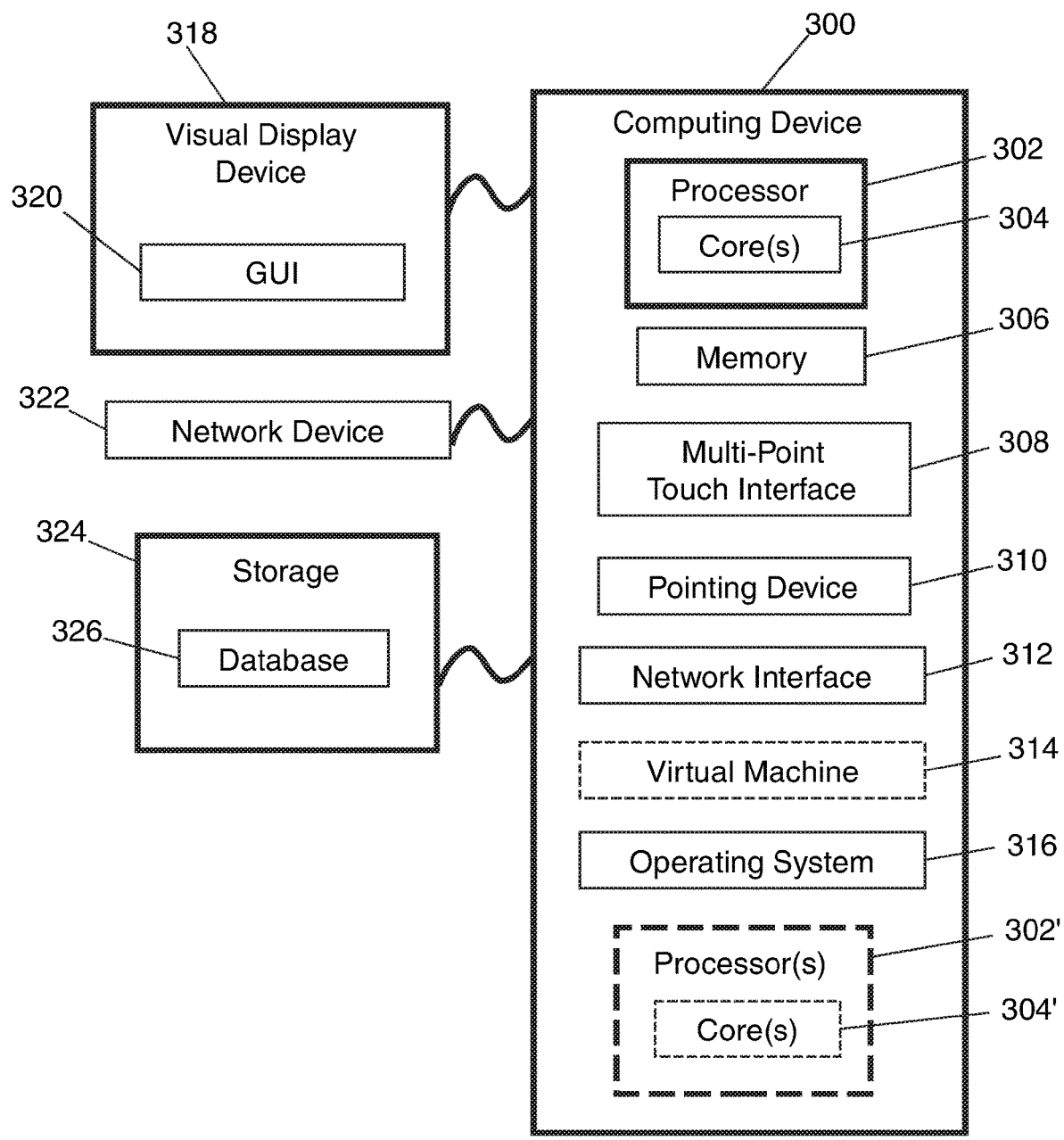
FIG. 16 is a block diagram of an exemplary computing device for implementing an exemplary biometric security system in accordance with the present disclosure.

FIG. 16 is a block diagram of a computing device 300 in accordance with exemplary embodiments of the present disclosure. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the computing device 300 may store computer-readable and computer-executable instructions or software for implementing exemplary embodiments of the present disclosure (e.g., instructions for operating the illumination sources, instructions for operating the processing device, instructions for operating the camera, instructions for operating the communication interface, instructions for operating the user interface, instructions for operating the central computing system, combinations thereof, or the like). The computing device 300 also includes configurable and/or programmable processor 302 and associated core 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' may each be a single core processor or multiple core (304 and 304') processor.

Virtualization may be employed in the computing device 300 so that infrastructure and resources in the computing device 300 may be shared dynamically. A virtual machine 314 may be provided to handle a process running on multiple processors so that the process appears to be using only one computing resource rather than multiple computing resources. Multiple virtual machines may also be used with one processor. Memory 306 may include a computer system memory or random access memory, such as DRAM, SRAM, EDO RAM, and the like. Memory 306 may include other types of memory as well, or combinations thereof.

A user may interact with the computing device 300 through a visual display device 318 (e.g., a personal computer, a mobile smart device, or the like), such as a computer monitor, which may display one or more user interfaces 320 (e.g., a graphical user interface) that may be provided in accordance with exemplary embodiments. The computing device 300 may include other I/O devices for receiving input from a user, for example, a camera, a sensor, a keyboard, a fingerprint scanner, or any suitable multi-point touch interface 308, a pointing device 310 (e.g., a mouse). The keyboard 308 and the pointing device 310 may be coupled to the visual display device 318. The computing device 300 may include other suitable conventional I/O peripherals.

The computing device 300 may also include one or more storage devices 324, such as a hard-drive, CD-ROM, eMMC (MultiMediaCard), SD (secure digital) card, flash drive, non-volatile storage media, or other computer readable media, for storing data and computer-readable instructions and/or software that implement exemplary embodiments of the biometric security systems described herein. Exemplary storage device 324 may also store one or more databases 326 for storing any suitable information required to implement exemplary embodiments. For example, exemplary storage device 324 can store one or more databases 326 for storing information, such as data relating to challenges, captures images, preset valid responses, biometric data, combinations thereof, or the like, and computer-readable instructions and/or software that implement exemplary embodiments described herein. The databases 326 may be updated by manually or automatically at any suitable time to add, delete, and/or update one or more items in the databases.

The computing device 300 can include a network interface 312 configured to interface via one or more network devices 322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 312 may include a built-in network adapter, network interface card, PCMCIA network card, PCI/PCIe network adapter, SD adapter, Bluetooth adapter, card bus network adapter, wireless network adapter, USB network adapter, modem or any other device suitable for interfacing the computing device 300 to any type of network capable of communication and performing the operations described herein. Moreover, the computing device 300 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 300 may run any operating system 316, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 316 may be run in native mode or emulated mode. In an exemplary embodiment, the operating system 316 may be run on one or more cloud machine instances.

Figure 17:
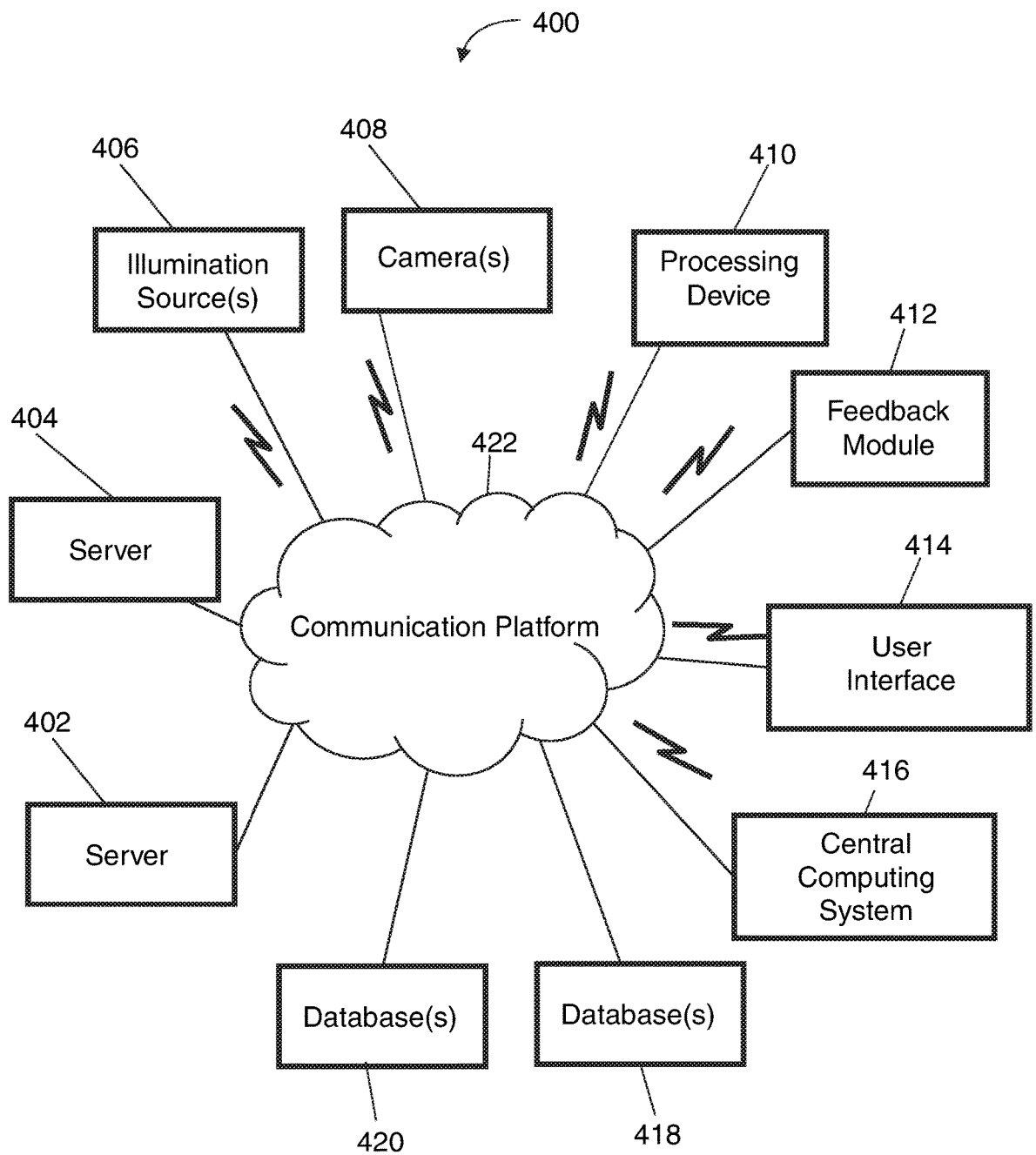
FIG. 17 is a block diagram of an exemplary biometric security system environment in accordance with the present disclosure.

FIG. 17 is a block diagram of an exemplary biometric security system environment 400 in accordance with exemplary embodiments of the present disclosure. The environment 400 can include servers 402, 404 configured to be in communication with one or more illumination sources 406, one or more cameras 408, one or more processing devices 410, a feedback module 412, a user interface 414, and a central computing system 416 via a communication platform 422, which can be any network over which information can be transmitted between devices communicatively coupled to the network. For example, the communication platform 422 can be the Internet, Intranet, virtual private network (VPN), wide area network (WAN), local area network (LAN), and the like. In some embodiments, the communication platform 422 can be part of a cloud environment.

The environment 400 can include repositories or databases 418, 420, which can be in communication with the servers 402, 404, as well as the one or more illumination sources 406, one or more cameras 408, one or more processing devices 410, the feedback module 412, the user interface 414, and the central computing system 416, via the communications platform 422.

In exemplary embodiments, the servers 402, 404, one or more illumination sources 406, one or more cameras 408, one or more processing devices 410, the feedback module 412, the user interface 414, and the central computing system 416 can be implemented as computing devices (e.g., computing device 300). Those skilled in the art will recognize that the databases 418, 420 can be incorporated into one or more of the servers 402, 404. In some embodiments, the databases 418 420 can store data relating to challenges, captured images, preset valid responses, biometric data, combinations thereof, or the like, and such data can be distributed over multiple databases 418, 420.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A biometric security system, comprising:
   an interface;
   a biometric acquisition device;
   a camera; and
   a processing device in communication with the interface and the biometric acquisition device, the processing device configured to:
   (i) display a first challenge to a subject via the interface, the first challenge including:
      (a) movement of a gaze attractor in the interface to induce motion of an eye of the subject to follow the gaze attractor, or
      (b) a request for visual input of a numerical passcode using a numerical display of the interface;
   (ii) receive as input a response to the first challenge from the subject;
   (iii) capture one or more images of the subject with the camera during input of the response to the first challenge from the subject;
   (iv) contemporaneous to receiving the response to the first challenge from the subject, capture a biometric characteristic of the subject with the biometric acquisition device;
   (v) analyze the received response to the first challenge relative to a preset valid response by determining a distance of the subject and a gaze angle of the subject relative to the interface based on the one or more captured images, and selecting a position of the gaze attractor on the interface or a number of the numerical display determined to be of focus by the subject based on the distance of the subject and the gaze angle;

(vi) analyze the biometric characteristic of the subject for biometric authenticity; and (vii) verify the subject based on both a successful match between the response to the first challenge and the preset valid response, and a successful finding of biometric authenticity, the successful match between the response to the first challenge and the preset valid response indicating a liveness of the subject.

2. The biometric security system of claim 1, wherein the processing device is configured to provide a signal to the subject for visually entering the numerical passcode using the numerical display of the interface by sequentially focusing on each number of the numerical passcode on the numerical display for a predetermined period of time.

3. The biometric security system of claim 1, wherein the camera is configured to capture the one or more images of the subject during sequential focus of the subject on each number of the numerical passcode.

4. The biometric security system of claim 3, wherein the processing device provides a limited time period for the subject to focus on each sequential number of the numerical passcode.

5. The biometric security system of claim 1, wherein the processing device is configured to output a visual indicator regarding the selected number of the numerical display.

6. The biometric security system of claim 1, wherein the processing device is configured to provide a signal to the subject for visually entering the numerical passcode using the numerical display of the interface by sequentially focusing on each number of the numerical passcode on the numerical display and blinking to sequentially confirm selection of each number.

7. The biometric security system of claim 1, wherein:
the processing device is configured to display a second challenge to the subject via the interface;
the second challenge is a request for input of the preset valid response in a form of a numerical passcode;
the interface comprises a numerical display;
the processing device is configured to provide a signal to the subject for entering the numerical passcode using the numerical display of the interface by sequentially focusing on each number of the numerical passcode on the numerical display and actuating an input means of the interface to sequentially confirm selection of each number; and
the biometric acquisition device comprises a fingerprint scanner of the interface configured to detect a fingerprint of the subject during actuation of the input means.

8. The biometric security system of claim 1, wherein:
the processing device is configured to display a second challenge to the subject via the interface;
the second challenge is a request for input of the preset valid response in a form of a numerical passcode;
the interface comprises a numerical display;
the processing device is configured to provide a signal to the subject for entering the numerical passcode using the numerical display of the interface by sequentially actuating each number of the numerical passcode on the numerical display; and
the biometric acquisition device comprises a fingerprint scanner of the interface configured to detect a fingerprint of the subject during actuation of at least one number of the numerical passcode.

9. The biometric security system of claim 1, wherein the processing device is configured to analyze the captured one or more images of the subject using iris segmentation and matching routines.

10. The biometric security system of claim 1, wherein the processing device is configured to measure at least one of a position of an iris of the subject within a socket relative to corners of an eye, a distance of the iris from eyelids of the eye, an eyelid opening distance, eyelid opening movement, a relative position between a pupil of the subject and specular reflection, or a size of the specular reflection.

11. The biometric security system of claim 1, wherein:
the processing device is configured to display a second challenge to the subject via the interface;
the biometric acquisition device comprises a fingerprint scanner, and the second challenge is a request for input of the preset valid response in a form of an initial position of a finger of the subject against the fingerprint scanner and a subsequent position of the finger of the subject against the fingerprint scanner; and
the processing device is configured to scan the finger of the subject positioned against the fingerprint scanner in the initial position, and the processing device is configured to provide a signal to the subject for rotating the finger by a preset angle to the subsequent position.

12. The biometric security system of claim 1, wherein the processing device is configured to analyze the captured one or more images of the subject for at least one of facial expression variation, blinking frequency, or iris texture.

13. The biometric security system of claim 1, wherein the processing device is configured substantially simultaneously receive the response to the first challenge from the subject and capture the biometric characteristic of the subject with the biometric acquisition device.

14. A method of verification of a biometric security system, comprising:
displaying a first challenge to a subject via an interface of the biometric security system, the first challenge including:
(i) movement of a gaze attractor in the interface to induce motion of an eye of the subject to follow the gaze attractor, or
(ii) a request for visual input of a numerical passcode using a numerical display of the interface;
receiving as input a response to the first challenge from the subject;
capturing one or more images of the subject with a camera during input of the response to the first challenge from the subject;
contemporaneous to receiving the response to the first challenge from the subject, capturing a biometric characteristic of the subject with a biometric acquisition device;
analyzing the received response to the first challenge relative to a preset valid response by determining a distance of the subject and a gaze angle of the subject relative to the interface based on the one or more captured images, and selecting a position of the gaze attractor on the interface or a number of the numerical display determined to be of focus by the subject based on the distance of the subject and the gaze angle;
analyzing the captured biometric characteristic of the subject for biometric authenticity; and
verifying the subject based on both a successful match between the response to the first challenge and the preset valid response, and a successful finding of biometric authenticity, the successful match between the response to the first challenge and the preset valid response indicating a liveness of the subject.

15. The method of claim 14, comprising providing a signal to the subject for visually entering the numerical passcode using the numerical display of the interface by sequentially focusing on each number of the numerical passcode on the numerical display for a predetermined period of time.

16. The method of claim 14, comprising providing a signal to the subject for visually entering the numerical passcode using a numerical display of the interface by sequentially focusing on each number of the numerical passcode on the numerical display and blinking to sequentially confirm selection of each number.

17. The method of claim 14, comprising displaying a second challenge to the subject via the interface, wherein the second challenge is a request for input of the preset valid response in a form of a numerical passcode, and the method comprises:
  providing a signal to the subject for visually entering the numerical passcode using a numerical display of the interface by sequentially focusing on each number of the numerical passcode on the numerical display and actuating an input means of the interface to sequentially confirm selection of each number; and
  detecting a fingerprint of the subject with a biometric acquisition device during actuation of the input means.

18. The method of claim 14, comprising displaying a second challenge to the subject via the interface, wherein the second challenge is a request for input of the preset valid response in a form of a numerical passcode, and the method comprises:
  providing a signal to the subject for entering the numerical passcode using a numerical display of the interface by sequentially actuating each number of the numerical passcode on the numerical display; and
  detecting a fingerprint of the subject with a biometric acquisition device during actuation of at least one number of the numerical passcode.

19. The method of claim 14, wherein the biometric acquisition device comprises a fingerprint scanner, the method comprises displaying a second challenge to the subject via the interface, and the second challenge is a request for input of the preset valid response in a form of an initial position of a finger of the subject against the fingerprint scanner and a subsequent position of the finger of the subject against the fingerprint scanner, the method comprising scanning the finger of the subject positioned against the fingerprint scanner in the initial position, and providing a signal to the subject for rotating the finger by a preset angle to the subsequent position.

20. A non-transitory computer-readable medium storing instructions for biometric security system verification that are executable by a processing device, wherein execution of the instructions by the processing device causes the processing device to:
  display a first challenge to a subject via an interface of the biometric security system, the first challenge including:
    (i) movement of a gaze attractor in the interface to induce motion of an eye of the subject to follow the gaze attractor, or
    (ii) a request for visual input of a numerical passcode using a numerical display of the interface;
  receive as input a response to the first challenge from the subject;
  contemporaneous to receiving the response to the first challenge from the subject, capture a biometric characteristic of the subject with a biometric acquisition device;
  capture one or more images of the subject with a camera during input of the response to the first challenge from the subject;
  analyze the received response to the first challenge relative to a preset valid response by determining a distance of the subject and a gaze angle of the subject relative to the interface based on the one or more captured images, and selecting a position of the gaze attractor on the interface or a number of the numerical display determined to be of focus by the subject based on the distance of the subject and the gaze angle;
  analyze the captured biometric characteristic of the subject for biometric authenticity; and
  verify the subject based on both a successful match between the response to the first challenge and the preset valid response, and a successful finding of biometric authenticity, the successful match between the response to the first challenge and the preset valid response indicating a liveness of the subject.

* * * * *